US012699208B2

(12) United States Patent
Miyazaki et al.

(10) Patent No.: US 12,699,208 B2
(45) Date of Patent: Aug. 4, 2026

(54) PHOTOCHROMIC COMPOUND, PHOTOCHROMIC CURABLE COMPOSITION, CURED BODY, LENS AND EYEGLASSES

(71) Applicant: TOKUYAMA CORPORATION, Shunan (JP)

(72) Inventors: Masayuki Miyazaki, Shunan (JP); Katsuhiro Mori, Shunan (JP); Junji Momoda, Shunan (JP)

(73) Assignee: TOKUYAMA CORPORATION, Shunan (JP)

(*) Notice: Subject to any disclaimer, the term of this patent is extended or adjusted under 35 U.S.C. 154(b) by 632 days.

(21) Appl. No.: 18/019,745

(22) PCT Filed: Aug. 4, 2021

(86) PCT No.: PCT/JP2021/028985

§ 371 (c)(1),
(2) Date: Feb. 3, 2023

(87) PCT Pub. No.: WO2022/030557

PCT Pub. Date: Feb. 10, 2022

(65) Prior Publication Data

US 2023/0280500 A1 Sep. 7, 2023

(30) Foreign Application Priority Data

Aug. 6, 2020 (JP) ................................ 2020-134224

(51) Int. Cl.
*G02B 1/04* (2006.01)
*C08G 65/34* (2006.01)
*C08L 71/08* (2006.01)

(52) U.S. Cl.
CPC ............ *G02B 1/041* (2013.01); *C08G 65/34* (2013.01); *C08L 71/08* (2013.01)

(58) Field of Classification Search
CPC .......... G02B 1/041; C08G 65/34; C08L 71/08
See application file for complete search history.

(56) References Cited

U.S. PATENT DOCUMENTS

| | | | | |
|---|---|---|---|---|
| 4,116,862 | A | 9/1978 | Wippler | |
| 5,961,892 | A * | 10/1999 | Gemert | C07D 311/94 546/281.1 |
| 2005/0269556 | A1 | 12/2005 | Evans et al. | |
| 2008/0006798 | A1 * | 1/2008 | Evans | C09D 11/50 252/586 |
| 2011/0147681 | A1 | 6/2011 | Evans et al. | |
| 2014/0027684 | A1 | 1/2014 | Evans et al. | |
| 2014/0042377 | A1 | 2/2014 | Evans et al. | |
| 2017/0096528 | A1 | 4/2017 | Kee et al. | |
| 2018/0341043 | A1 * | 11/2018 | Kawaguchi | G02C 7/10 |
| 2020/0190106 | A1 | 6/2020 | Miyazaki et al. | |
| 2021/0032532 | A1 * | 2/2021 | Miyazaki | C08G 18/722 |
| 2021/0155830 | A1 * | 5/2021 | Hiraren | B32B 27/08 |

FOREIGN PATENT DOCUMENTS

| | | | |
|---|---|---|---|
| JP | 52-151388 | A | 12/1977 |
| JP | 2002-524559 | A | 8/2002 |
| JP | 2006-505684 | A | 2/2006 |
| JP | 2019-182866 | A | 10/2019 |
| WO | WO 00/15630 | A1 | 3/2000 |
| WO | WO 2004/041961 | A1 | 5/2004 |
| WO | WO 2009/146509 | A1 | 12/2009 |
| WO | WO 2012/149599 | A1 | 11/2012 |
| WO | WO 2012/162725 | A1 | 12/2012 |
| WO | WO 2017/047742 | A1 | 3/2017 |
| WO | WO 2019/013249 | A1 | 1/2019 |
| WO | WO 2019/194281 | A1 | 10/2019 |
| WO | WO 2019/203205 | A1 | 10/2019 |

OTHER PUBLICATIONS

International Search Report for PCT/JP2021/028985 (PCT/ISA/210) mailed on Oct. 19, 2021.
Written Opinion of the International Searching Authority for PCT/JP2021/028985 (PCT/ISA/237) mailed on Oct. 19, 2021.

* cited by examiner

*Primary Examiner* — Bijan Ahvazi
(74) *Attorney, Agent, or Firm* — Birch, Stewart, Kolasch & Birch, LLP

(57) ABSTRACT

The present invention aims to provide a photochromic compound capable of exhibiting photochromic properties regardless of matrix, and the compound is stably dispersed without aggregation in a process of molding (curing) an optical base material. According to the present invention, a polymer photochromic compound, which has a block polymeric group of an oligomeric chain group having relatively favorable compatibility with a solid matrix and an oligomeric chain group having poor compatibility with a solid matrix, forms a nano- to micro-phase separation structure in a solid matrix. The compound does not rely on the solid matrix, its dispersibility is improved and aggregation is prevented or reduced, whereby excellent photochromic properties can be exhibited.

14 Claims, No Drawings

PHOTOCHROMIC COMPOUND, PHOTOCHROMIC CURABLE COMPOSITION, CURED BODY, LENS AND EYEGLASSES

FIELD OF THE INVENTION

The present invention relates to a photochromic compound, a photochromic curable composition, a cured body, a lens, and eyeglasses.

BACKGROUND OF THE INVENTION

Photochromic compounds represented by chromene compounds, flugide compounds, spirooxazine compounds and the like have photochromic properties. Namely, the compounds quickly change color when irradiated with light containing ultraviolet rays such as sunlight or light of a mercury lamp, and return to their original colors when the irradiation is stopped and the compounds are kept in a dark. These compounds with the properties have been used in various applications, particularly in applications of optical materials.

For instance, an eyeglass lens containing a photochromic compound is quickly colored outdoors irradiated with light such as sunlight containing ultraviolet rays, and function as sunglasses. Indoors without irradiation of the light, the lens will be faded to function as a transparent glass lens. Demand for photochromic optical articles having such photochromic performance has been increasing in recent years.

Examples of the methods for producing the photochromic optical articles include a method of using a photochromic composition containing a polymerizable compound and a photochromic compound.

(a) A method of directly forming an optical article such as a lens by dissolving a photochromic compound in a polymerizable compound and polymerizing to form a cured body, which is called a kneading method.

(b) A method of providing a cured layer comprising a photochromic compound dispersed therein on the surface of a plastic molded article such as a lens, by coating or casting polymerization, which is called a lamination method.

(c) A method of bonding two optical sheets by curing an adhesive layer formed from an adhesive resin in which a photochromic compound is dispersed, which is called a binder method.

An optical article to which photochromic properties are imparted is further required to have the following properties.

(I) Coloration degree in the visible light range before irradiation with ultraviolet light (initial coloration) is low.

(II) Coloration degree when irradiated with ultraviolet rays (chromogenic density) is high.

(III) Speed to return to the original state after stopping ultraviolet irradiation (fading rate) is high.

(IV) Repeated durability of the reversible action of color development to fading is favorable.

(V) Storage stability is high.

(VI) It is easily molded into various shapes.

Various photochromic compounds have been reported so far. However, it has been reported that even a photochromic compound having good photoresponsiveness in a liquid matrix has a tendency to exhibit poor photoresponsiveness and a long fading half-life in a solid matrix. The reason is considered as follows. Since the free space is overwhelmingly small in the solid matrix compared to that in the liquid matrix, the structural change of the photochromic compound is constrained. As a method for solving this problem, a photochromic compound having an oligomeric chain group such as a polyalkylene oxy oligomeric chain group or a polysiloxane oligomeric chain group (hereinafter, also referred to as a "polymer photochromic compound") have been disclosed recently. It has been reported that these polymer photochromic compounds exhibit low matrix dependency and excellent photoresponsiveness even in a solid matrix because the oligomeric chain group can form a free space. (See Patent Documents 1 to 6).

PRIOR ART DOCUMENTS

Patent Documents

Patent Document 1: WO2004/041961

Patent Document 2: WO2000/015630

Patent Document 3: WO2009/146509

Patent Document 4: WO2012/149599

Patent Document 5: WO2012/162725

Patent Document 6: JP 2019-182866A

SUMMARY OF THE INVENTION

Problems to be Solved by the Invention

As noted above, a polymer photochromic compounds exhibits high photochromic properties in a solid matrix. However, a cured body of a photochromic composition containing the polymer photochromic compound may become white-turbid. In other words, it is considered that the polymer photochromic compound aggregates in the cured body to cause white turbidity when the compatibility between the solid matrix and the polymer photochromic compound is low.

On the other hand, a low-molecular photochromic compound having no oligomeric chain group does not aggregate in a solid matrix. Therefore, when a composition containing only the low-molecular photochromic compound is used, a transparent photochromic cured body can be obtained. However, the low-molecular photochromic compound has high matrix dependency, and a fading rate or the like in a solid matrix may be a problem.

It is an object of the present invention to provide a photochromic compound that can exhibit photochromic properties regardless of the type of matrices and that is stably dispersed without aggregation in a cured body. The present invention provides also a photochromic curable composition, a cured body, a lens, and an eyeglasses, containing the photochromic compound.

Means for Solving the Problem

In order to solve the problems, the present inventors studied compatibility between a polymer photochromic compound and a solid matrix while keeping a free space, and as a result, the present inventors considered that the following process can enhance compatibility with the solid matrix while keeping the free space as described below.

In other words, the present inventors expected as follows. A polymer photochromic compound having a block polymer group is prepared. The block polymer group has an oligomeric chain group having relatively favorable compatibility with a solid matrix and an oligomeric chain group having poor compatibility with the solid matrix, so that the oligomeric chain group moiety with favorable compatibility is dissolved in the solid matrix, while the oligomeric chain group moiety with poor compatibility forms a free space, thereby forming a nano- to micro-phase separation structure. As a result, the polymer photochromic compound does not aggregate in a solid matrix, and dispersibility is improved. Based on this expectation, the present inventors studied various block polymer groups as oligomeric chain groups, and found that a high photochromic properties can be exhibited while retaining excellent dispersibility in the solid matrix in a case where block polymer groups of a specific combination are used, thereby completing the present invention.

That is, a first embodiment refers to a photochromic compound shown by the following formula (1) or (2).

[CF 1]

$$PC\left(L1-X1-L2\left[X2-Z\right]_m\right)_n \quad (1)$$

[CF 2]

$$PC\left(L1-X1-L2\left[X2-L3\left\{X3-Z\right\}_l\right]_m\right)_n \quad (2)$$

(In the formulae,

PC is a group having at least one photochromic moiety.

X1 and X3 are each independently a linear or branched alkylene group having 12 to 30 carbon atoms, a polyoxypropylene group having 3 to 200 repeating units, a polyoxyethylene group having 3 to 200 repeating units, a polyoxytetramethylene group having 3 to 200 repeating units, or a polysiloxane group having 3 to 200 repeating units.

The repeating unit of the polysiloxane group comprises a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms.

X2 is a linear or branched alkylene group having 12 to 30 carbon atoms, a polyoxypropylene group having 3 to 200 repeating units, a polyoxyethylene group having 3 to 200 repeating units, or a polyoxytetramethylene group having 3 to 200 repeating units.

X1 and X2 are groups different from each other.

X2 and X3 are groups different from each other.

X1 and X3 may be groups of the same kind.

When X2 in the above formula (1) or X3 in the above formula (2) is a linear or branched alkylene group having 12 to 30 carbon atoms, Z is a hydrogen atom, a methyl group, or an alkyloxy group having 1 to 10 carbon atoms. When X2 in the above formula (1) or X3 in the above formula (2) is a polyoxypropylene group having 3 to 200 repeating units, a polyoxyethylene group having 3 to 200 repeating units, a polyoxytetramethylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms, Z is a hydrogen atom, an alkyl group having 1 to 10 carbon atoms, or an alkyloxy group having 1 to 10 carbon atoms.

L1 is a direct bond or a divalent bond.

L2 is a direct bond or an m+1 valent bond.

L3 is a direct bond or an l+1 valent bond.

n is an integer of 1 to 8; m is an integer of 1 to 4; and 1 is an integer of 1 to 4.

A second embodiment refers to a photochromic curable composition comprising a photochromic compound according to the aforementioned embodiment and a polymerizable compound.

A third embodiment refers to a cured body formed by polymerizing the photochromic curable composition according to the aforementioned embodiment.

A fourth embodiment refers to a lens including the cured body according to the aforementioned embodiment.

A fifth embodiment refers to eyeglasses including the lens according to the aforementioned embodiment.

Effects of the Invention

The photochromic compound of the present invention exhibits excellent photochromic properties in a solid matrix. When a conventional polymer photochromic compound is used, problems such as white turbidity of a cured body may occur. In contrast, by using the photochromic compound of the present invention, a photochromic cured body having favorable photochromic properties and transparency can be produced.

DETAILED DESCRIPTION OF THE INVENTION

According to an embodiment, a photochromic compound represented by the following formula (1) is provided.

[CF 3]

$$PC\left(L1-X1-L2\left[X2-Z\right]_m\right)_n \quad (1)$$

In the formula (1), PC is a group having at least one photochromic moiety.

X1 is an alkylene group, a polyoxypropylene group, a polyoxyethylene group, a polyoxytetramethylene group, or a polysiloxane group.

X2 is an alkylene group, a polyoxypropylene group, a polyoxyethylene group, or a polyoxytetramethylene group.

X1 and X2 are groups different from each other.

Z is a hydrogen atom, a methyl group, or an alkyloxy group having 1 to 10 carbon atoms when X2 is an alkylene group. Z is a hydrogen atom, an alkyl group having 1 to 10 carbon atoms, or an alkyloxy group having 1 to 10 carbon atoms when X2 is a polyoxypropylene group, a polyoxyethylene group, a polyoxytetramethylene group, or a polysiloxane group.

L1 is a direct bond or a divalent bond.

L2 is a direct bond or an m+1 valent bond.

n is an integer of 1 to 8, and m is an integer of 1 to 4.

According to an embodiment, a photochromic compound represented by the following formula (2) is provided.

[CF 4]

$$PC\left(L1-X1-L2\left[X2-L3\left\{X3-Z\right\}_l\right]_m\right)_n \quad (2)$$

In the formula (2), PC, X1, X2, L1, L2, m and n are synonymous with those in the formula (1).

X3 is an alkylene group, a polyoxypropylene group, a polyoxyethylene group, a polyoxytetramethylene group, or a polysiloxane group.

X1 and X2 are groups different from each other. X2 and X3 are groups different from each other. X1 and X3 may be the same or different from each other.

Z is a hydrogen atom, a methyl group, or an alkyloxy group having 1 to 10 carbon atoms when X3 is an alkylene group. Z is a hydrogen atom, an alkyl group having 1 to 10 carbon atoms, or an alkyloxy group having 1 to 10 carbon atoms when X3 is a polyoxypropylene group, a polyoxyethylene group, a polyoxytetramethylene group, or a polysiloxane group.

L3 is a direct bond or an l+1 valent bond.

l is an integer of 1 to 4.

In X1, X2, or X3, the number of carbon atoms of the alkylene group is 12 to 30, and more preferably 12 to 20. The alkylene group may be linear or may be branched, and preferably linear.

In X1, X2, or X3, the repeating unit of the polyoxypropylene group is represented by ($-CH_2-CH(CH_3)-O-$). The number of repeating units is 3 to 200, preferably 5 to 150, more preferably 5 to 100, and still more preferably 10 to 50.

In X1, X2, or X3, the repeating unit of the polyoxyethylene group is represented by ($-CH_2-CH_2-O-$). The number of repeating units is 3 to 200, preferably 5 to 150, more preferably 5 to 100, and still more preferably 10 to 50.

In X1, X2, or X3, the repeating unit of the polyoxytetramethylene group is represented by ($-CH_2-CH_2-CH_2-CH_2-O-$). The number of repeating units is 3 to 200, preferably 5 to 150, more preferably 5 to 100, and still more preferably 10 to 50.

In X1, X2, or X3, the repeating unit of the polysiloxane group is a silyleneoxy group (siloxane group) represented by ($-Si(R^{10})_2-O-$). $R^{10}$ is a linear or branched alkyl group having 1 to 10 carbon atoms, a linear or branched alkyloxy group having 1 to 10 carbon atoms, or an aromatic group having 6 to 10 carbon atoms. $R^{10}$ is preferably an alkyl group, and more preferably a methyl group. Though the two $R^{10}$ may be different from each other or may be the same, preferably they are the same. The number of repeating units of the polysiloxane group is 3 to 200, preferably 5 to 150, more preferably 5 to 100, and still more preferably 10 to 50.

The photochromic compound according to the embodiment includes oligomeric chains of X1 and X2 structured differently from each other. It is considered that the compatibility of X1 and the compatibility of X2 in a specific matrix differ from each other. The X1, which exhibits relatively high compatibility in certain matrices, may reduce or prevent aggregation of photochromic compounds. The X2, which exhibits relatively poor compatibility, may contribute to form free spaces in which photochromic compounds are prone to make structural changes in the matrix. In other matrices, X1 may exhibit relatively poor compatibility and X2 may exhibit relatively high compatibility. Therefore, when a composition containing a photochromic compound comprising both X1 and X2 is used, a cured body having excellent photochromic properties and high transparency is obtained regardless of the type of matrices.

Further, in the photochromic compound of the embodiment, Z is a hydrogen atom, an alkyl group having 1 to 10 carbon atoms, or an alkyloxy group having 1 to 10 carbon atoms. With these structures, a microlayer separation structure can be formed more effectively.

Further, the photochromic compound according to the embodiment may include a linking group L2 between the X1 and the X2. In the photochromic compound containing the linking group L2 between X1 and X2, since the moieties having different compatibility can be separated clearly due to the linking group L1, the microlayer separation structure can be formed more effectively.

Detailed description is as follows.

<X1, X2, X3>

X1 and X3 in a photochromic compound are each independently an oligomeric chain group selected from: a linear or branched alkylene group having 12 to 30 carbon atoms, a polyoxypropylene group having 3 to 200 repeating units, a polyoxyethylene group having 3 to 200 repeating units, a polyoxytetramethylene group having 3 to 200 repeating units, or, as a substituent, a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms.

X2 is an oligomeric chain group selected from a group consisting of a linear or branched alkylene group having 12 to 30 carbon atoms, a polyoxypropylene group having 3 to 200 repeating units, a polyoxyethylene group having 3 to 200 repeating units, and a polyoxytetramethylene group having 3 to 200 repeating units.

Among the above-mentioned linear or branched alkylene group having 12 to 30 carbon atoms, a linear alkylene group is preferred.

Preferred examples of the aforementioned polysiloxane group, which comprises a silylene oxy group having two substituents selected from a linear or branched alkyl group having 1 to 10 carbon atoms, a linear or branched alkoxy group having 1 to 10 carbon atoms and an aromatic group having 6 to 10 carbon atoms, as a substituent, include a polydimethylsiloxane group, a polymethylphenylsiloxane group, and a polydiphenylsiloxane group.

In the photochromic compound, X1 and X2 that are bonded via a bond L2 described later and/or X2 and X3 that are bonded via a bond L3 described later are selected from groups different from each other, though X1 and X3 may be the same group or may be different groups. As described above, it is considered that by differentiating X1 from X2 and differentiating X2 from X3, the group becomes a block polymer group, so that the effect of the present invention can be obtained.

For instance, when X2 is a polyoxypropylene group having 3 to 200 repeating units, X1 and X3 are groups other than the polyoxypropylene group having 3 to 200 repeating units. That is, they are each an oligomeric chain group selected from a linear or branched alkylene group having 12 to 30 carbon atoms, a polyoxyethylene group having 3 to 200 repeating units, a polyoxytetramethylene group having 3 to 200 repeating units, or, as a substituent, a polysiloxane group having 3 to 200 repeating units comprising a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms.

The combination of X1, X2 and X3 may be appropriately determined depending on the required photochromic performance and the type of the solid matrix in which the photochromic compound is to be dispersed.

Among them, in the case of a photochromic compound represented by the above formula (1), combinations as mentioned below are preferred.

In a combination, X1 is an oligomeric chain group selected from a linear or branched alkylene group having 12 to 30 carbon atoms, a polyoxypropylene group having 3 to 200 repeating units, or, as a substituent, a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms; and X2 is an oligomeric chain group selected from a polyoxyethylene group having 3 to 200 repeating units, or a polyoxytetramethylene group having 3 to 200 repeating units.

In another combination, X1 is a polyoxyethylene group having 3 to 200 repeating units; and X2 is an oligomeric chain group selected from a linear or branched alkylene group having 12 to 30 carbon atoms, a polyoxypropylene group having 3 to 200 repeating units, or a polyoxytetramethylene group having 3 to 200 repeating units.

In still another combination, X1 is a polyoxytetramethylene group having 3 to 200 repeating units; and X2 is an oligomeric chain group selected from a linear or branched alkylene group having 12 to 30 carbon atoms, a polyoxypropylene group having 3 to 200 repeating units, or a polyoxyethylene group having 3 to 200 repeating units.

In the case of a photochromic compound represented by the above formula (2), the following combinations are preferred.

In a combination, X1 is a polyoxyethylene group having 3 to 200 repeating units; X2 is an oligomeric chain group selected from a linear or branched alkylene group having 12 to 30 carbon atoms, a polyoxypropylene group having 3 to 200 repeating units, or a polyoxytetramethylene group having 3 to 200 repeating units; and X3 is an oligomeric chain group selected from a linear or branched alkylene group having 12 to 30 carbon atoms, a polyoxyethylene group having 3 to 200 repeating units, a polyoxypropylene group having 3 to 200 repeating units, a polyoxytetramethylene group having 3 to 200 repeating units, or, as a substituent, a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms, where X2 and X3 are different from each other.

In another combination, X1 is an oligomer chain group selected from a linear or branched alkylene group having 12 to 30 carbon atoms, a polyoxypropylene group having 3 to 200 repeating units, or, as a substituent, a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms; X2 is an oligomeric chain group selected from a polyoxyethylene group having 3 to 200 repeating units, or a polyoxytetramethylene group having 3 to 200 repeating units; and X3 is an oligomeric chain group selected from a linear or branched alkylene group having 12 to 30 carbon atoms, a polyoxyethylene group having 3 to 200 repeating units, a polyoxypropylene group having 3 to 200 repeating units, a polyoxytetramethylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms, where X2 and X3 are different from each other.

In still another combination, X1 is a polyoxytetramethylene group having 3 to 200 repeating units; X2 is an oligomeric chain group selected from a linear or branched alkylene group having 12 to 30 carbon atoms, a polyoxyethylene group having 3 to 200 repeating units, or a polyoxypropylene group having 3 to 200 repeating units; and X3 is an oligomeric chain group selected from a linear or branched alkylene group having 12 to 30 carbon atoms, a polyoxyethylen group having 3 to 200 repeating units, a polyoxypropylene group having 3 to 200 repeating units, a polyoxytetramethylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms, where X2 and X3 are different from each other.

Though there is no particular limitation, since X1, X2 and X3 are also greatly influenced by the structure of the solid matrix and the like, they may be appropriately selected in consideration of compatibility with the solid matrix.

For instance, in the case of a thiourethane-based or urethane-based solid matrix, an oligomeric chain group selected as an oligomeric chain group having favorable compatibility is a polyoxymethylene group having 3 to 200 repeating units, or a polyoxytetramethylene group having 3 to 200 repeating units. An oligomeric chain group selected as an oligomeric chain group having poor compatibility is a linear or branched alkylene group having 12 to 30 carbon atoms, a polyoxypropylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms. These oligomeric chain groups are preferably combined into a block polymer group.

In the case of an acrylic solid matrix, an oligomeric chain group selected as an oligomeric chain group having favorable compatibility is a polyoxymethylene group having 3 to 200 repeating units or a polyoxytetramethylene group having 3 to 200 repeating units. An oligomeric chain group selected as an oligomeric chain group having poor compatibility is a polyoxypropylene group having 3 to 200 repeating units or a polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms. These oligomeric chain groups are preferably combined into a block polymer group.

The number of repeating units of the polyoxypropylene group having 3 to 200 repeating units, the polyoxymethylene group having 3 to 200 repeating units, the polyoxytetramethylene group having 3 to 200 repeating units, or the polysiloxane group having 3 to 200 repeating units comprising a silylene oxy group having two substituents selected from the group consisting of a linear or branched alkyl group having 1 to 10 carbon atoms, a linear or branched alkoxy group having 1 to 10 carbon atoms, and an aromatic group having 6 to 10 carbon atoms, is more preferably 4 to 150, still more preferably 5 to 120, and most preferably 6 to 100.

In the above formulae (1) and (2), the number average molecular weight of the moiety excluding the group PC having a photochromic moiety is not particularly limited as long as it falls within the range of the number of repeating units described above. It is preferably 300 to 20000, more preferably 400 to 15000, still more preferably 500 to 12000, and most preferably 600 to 10000 per group having a photochromic moiety. By setting the number average molecular weight to be equal to or higher than the lower limit, a nano- to micro-phase separation structure is formed, formation of a free space in a solid matrix becomes sufficient, and photochromic properties tend to be improved. Further, by setting the number average molecular weight to be equal to or lower than the upper limit, the concentration of the photochromic compound per unit weight will not be lowered, and thus, there is no necessity of increasing addition amount excessively.

<PC>

A photochromic compound needs a group PC having at least one photochromic moiety within the molecule. Any known photochromic moieties can be employed therefor.

The photochromic compound is not particularly limited as long as it comprises at least one group having a photochromic moiety. Among them, considering the productivity of the photochromic compound itself, the photochromic properties and the like, the number of groups having a photochromic moiety is preferably 1 to 10, more preferably 1 to 6, still more preferably 1 to 4, and particularly preferably 1 to 2. When a plurality of groups having photochromic moieties are provided, the photochromic moieties may have the same structure, or two or more different types of photochromic moieties may be included.

Representative examples of such photochromic moieties include naphthopyran, spirooxazine, spiropyran, fulgide, fulgimide, and diarylethene.

Among them, naphthopyran, spirooxazine, and spiropyran are preferred in view of the fact that excellent photochromic properties can be exhibited particularly in chromogenic density and fading rate. Naphthopyran is more preferred, and indenonaphtopyran is further preferred. And among them, indeno[2,1-f]naphtho[1,2-b]pyran is particularly preferred.

Indeno[2,1-f]naphtho[1,2-b]pyran exemplified as a particularly preferred photochromic moiety is a compound represented by the formula (6) below.

[CF 5]

(6)

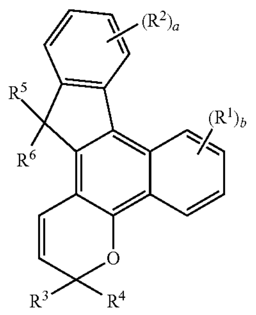

(In the formula, $R^1$ and $R^2$ are each independently a group to bond to the L1 described below, or a hydroxyl group, an alkyl group, a haloalkyl group, a cycloalkyl group that may have a substituent, an alkoxy group, an amino group, a substituted amino group, an amide group, a substituted amide group, a heterocyclic group that may have a substituent, a cyano group, a halogen atom, an alkylthio group, an arylthio group that may have a substituent, a nitro group, a formyl group, a hydroxycarbonyl group, an alkylcarbonyl group, an alkoxycarbonyl group, an aralkyl group that may have a substituent, an aralkoxy group that may have a substituent, an aryloxy group that may have an substituent, an aryl group that may have a substituent, a heteroaryl group that may have a substituent, a thiol group, an alkoxyalkylthio group, a haloalkylthio group, or a cycloalkylthio group that may have a substituent;

a is an integer of 0 to 4, and b is an integer of 0 to 4;

when a is 2 to 4, a plurality of $R^2$ may be the same or different from each other;

when b is 2 to 4, a plurality of $R^1$ may be the same or different from each other;

when a is 2 to 4 and neighboring $R^2$ are present, the two neighboring $R^2$ together may form a ring that may contain an oxygen atom, a carbon atom, a sulfur atom, or a nitrogen atom together with a carbon atom to be bonded to these $R^2$, and the ring may have a substituent;

when b is 2 to 4 and neighboring $R^1$ are present, the two neighboring $R^1$ together may form a ring that may contain an oxygen atom, a carbon atom, a sulfur atom, or a nitrogen atom together with a carbon atom to be bonded to the $R^1$, and the ring may have a substituent;

$R^3$ and $R^4$ are each independently an aryl group or a heteroaryl group that may be substituted with a substituent, and the substituent may be a group to be bonded to the L1;

$R^5$ and $R^6$ are each independently a group to be bonded to the L1 described below, or a hydrogen atom, a hydroxyl group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group that may have a substituent, an aralkoxy group that may have a substituent, an aryloxy group that may have a substituent, an aryl group that may have a substituent, or a heterocyclic group that may have a substituent;

the two $R^5$ and $R^6$ together with carbon atoms at 13-position as a target for bonding, may form an aliphatic ring having 3 to 20 ring-membered carbon atoms, a fused polycyclic ring having an aromatic ring or an aromatic heterocyclic ring fused to the aliphatic ring, a heterocyclic ring having 3 to 20 ring-membered atoms, or a fused polycyclic ring having an aromatic ring or an aromatic heterocyclic ring fused to the heterocyclic ring, where the rings may have substituents;

at least one group selected from a substituent on an aryl group or a heteroaryl group of $R^1$, $R^2$ or $R^3$, a substituent on an aryl group or a heteroaryl group of $R^4$, or, $R^5$ and $R^6$, is a group to bond to L1 described below.)

For each of the groups exemplified above, the alkyl group preferably has 1 to 10 carbon atoms, the haloalkyl group preferably has 1 to 10 carbon atoms, the cycloalkyl group preferably has 3 to 8 carbon atoms, the alkoxy group preferably has 1 to 10 carbon atoms, the alkylcarbonyl group preferably has 2 to 7 carbon atoms, the alkoxycarbonyl group preferably has 2 to 7 carbon atoms, the aralkyl group preferably has 7 to 11 carbon atoms, the aralkoxy group preferably has 7 to 11 carbon atoms, the aryloxy group preferably has 6 to 12 carbon atoms, the aryl group preferably has 6 to 12 carbon atoms, the alkylthio group preferably has 1 to 10 carbon atoms, the cycloalkylthio group preferably has 3 to 8 carbon atoms, and the arylthio group preferably has 6 to 12 carbon atoms.

In the $R^1$, $R^2$, $R^3$, $R^4$, $R^5$ and $R^6$, the groups or the substituents that may be possessed by the ring groups formed by those groups, are introduced primarily to control the developed color tone and the like, and, of course, the substituents do not degrade the effects.

The following groups are particularly preferred in order to exhibit excellent photochromic properties.

$R^1$ preferably is an alkyl group having 1 to 10 carbon atoms, an alkoxy group having 1 to 10 carbon atoms, a substituted amino group, a heterocyclic group that may have a substituent, an alkylthio group, an arylthio group that may have a substituent, or an aryl group having 6 to 12 carbon atoms that may have a substituent. Further preferably, these groups are present at the 6-position and/or the 7-position of the indeno[2,1-f]naphtho[1,2-b]pyran. It is also preferred that $R^1$ is present at the 6- and 7-positions and together form an aliphatic ring (that may further have a substituent) that may contain an oxygen atom, a nitrogen atom, or a sulfur atom. At this time, it is preferable that the number of atoms of an aliphatic ring containing an oxygen atom, a nitrogen atom, or a sulfur atom (the number of atoms including a hetero atom and the number of carbon atoms located at the 6- and 7-positions) is 5 to 8. In addition, the aliphatic ring may have a substituent, and the substituent is preferably an alkyl group having 1 to 6 carbon atoms.

$R^2$ is preferably a hydrogen atom (when a=0), an alkyl group having 1 to 6 carbon atoms, an alkoxy group having 1 to 6 carbon atoms, a substituted amino group, a heterocyclic group that may have a substituent, a haloalkyl group having 1 to 6 carbon atoms, an aryl group having 6 to 12 carbon atoms that may have a substituent, a cyano group, or an arylthio group. It is particularly preferred that these groups be present at the 11-position of the indeno[2,1-f]naphtho[1,2-b]pyran.

$R^3$ and $R^4$ are preferably aryl groups having 6 to 12 ring-membered carbon atoms. Preferred examples of substituent possessed by an aryl group include an alkyl group having 1 to 10 carbon atoms, an alkoxy group having 1 to 10 carbon atoms, a substituted amino group, a heterocyclic group that has a ring-membered nitrogen atom and that is bonded to the carbon atom with the nitrogen atom (though it may have a substituent), and an arylthio group that may have a substituent. Particularly preferably, at least one of the substituents becomes a bond L1 detailed below.

It is more preferred that $R^5$ and $R^6$ are alkyl groups having 1 to 10 carbon atoms or L1 as detailed below. It is more preferable that the two $R^5$ and $R^6$ together with the carbon atoms at the 13-position to which they are bonded become an aliphatic ring having 3 to 20 ring-membered carbon atoms, a fused polycyclic ring having an aromatic ring or an aromatic heterocyclic ring fused to the aliphatic ring, a heterocyclic ring having 3 to 20 ring-membered atoms, or a fused polycyclic ring having an aromatic ring or an aromatic heterocyclic ring fused to the heterocyclic ring. Among these, it is further preferred that the ring is selected from a cyclopentane ring, a cyclohexane ring, a cycloheptane ring, a cyclooctane ring, a cyclononane ring, a cyclodecane ring, a cycloundecane ring, a cyclododecane ring, and a spirodicyclohexane ring. The spiro ring may have, as 1 to 10 substituent(s), an alkyl group having 1 to 6 carbon atoms or a cycloalkyl group having 5 to 7 carbon atoms. Alternatively, a cycloalkyl group having 5 to 7 carbon atoms may be ring-fused. A group represented by the following formula can be described as an example of a more suitable group.

[CF 6]

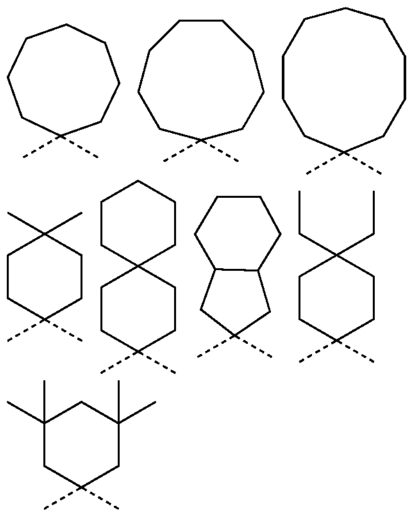

Examples of the indeno[2,1-f]naphtho[1,2-b]pyran that forms the aforementioned photochromic moieties are compounds described in WO1996/014596, WO2001/019813, WO2001/060811, WO2005/028465, WO2006/110221, WO2007/073462, WO2007/140071, WO2008/054942, WO2010/065393, WO2011/10744, WO2011/016582, WO2011/025056, WO2011/034202, WO2011/078030, WO2012/102409, WO2012/102410, and WO2012/121414. They can be used without any substantial limitations.

The group to be bonded to L1 may be a substituent on an aryl group or a heteroaryl group of a $R^1$, $R^2$, $R^3$; a substituent on an aryl group or a heteroaryl group of $R^4$; and a substituent possessed by a group that may have a substituent in the groups described in $R^5$ and $R^6$. Among them, it is preferable that the group to be bonded to L1 is substituted at the 3-position, the 6-position, the 7-position, the 11-position, or the 13-position of the indenonaphthopyran. Of these, 3- and 13-positions are particularly preferred because the productivity of the photochromic compound itself can be improved.

<Z>

Z is a hydrogen atom, a methyl group, or an alkyloxy group having 1 to 10 carbon atoms when X2 in the formula (1) or X3 in the formula (2) is a linear or branched alkylene group having 12 to 30 carbon atoms. Z is preferably a methyl group.

When X2 in the formula (1) or X3 in the formula (2) is a polyoxypropylene group having 3 to 200 repeating units, a polyoxyethylene group having 3 to 200 repeating units, a polyoxytetramethylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms, Z is a hydrogen atom, an alkyl group having 1 to 10 carbon atoms or an alkyloxy group having 1 to 10 carbon atoms. Z is preferably an alkyl group having 1 to 10 carbon atoms or an alkyloxy group having 1 to 10 carbon atoms.

<L1>

L1 is a direct bond or a divalent bond that binds photochromic moiety PC and an oligomeric chain group X1.

Among them, the group represented by the following formula (3) is preferred.

[CF 7]

$$-\left(Y1-\left(A1\right)_{o}Y2\right)_{p}- \quad (3)$$

(In the formula,

- Y1 and Y2 are divalent groups, each independently being a direct bond or a group comprising —O—, —S—, an amino group, a substituted amino group, a carbonyl group, and a combination thereof (exemplified by an ester group as a combination of —O— and a carbonyl group), or alternatively a substituted silylene group;
- A1 is a divalent group, which is a direct bond, or an alkylene group that may have a substituent having 1 to 10 carbon atoms, a cycloalkylene group that may have a substituent having 3 to 12 carbon atoms for forming a ring, an arylene group that may have a substituent having 6 to 12 carbon atoms for forming a ring, or a heterocyclic group that may have a substituent having 3 to 12 atoms for forming a ring;
- o is an integer of 1 to 3, and p is an integer of 1 to 5;
- when p is 2 or more, the divalent groups of the units of a plurality of o may be the same or different from each other; and
- when p is 2 or more, the divalent groups of the units of a plurality of p may be the same as or different from each other.)

Of these, particularly preferred groups are as follows.

A1 is preferably a group selected from a direct bond, a methylene group, an ethylene group, a propylene group, a butylene group, a pentylene group, a hexylene group, a cyclohexylene group, a phenylene group, or a group formed by substituting a methylene group of a cyclohexylene group with NH.

Preferably Y1 and Y2 are each a group selected from a direct bond, —O—, —S—, a carbonyl group, an ester group, a thioester group, an amide group, a urethane group, a thiourethane group, a dimethylsilylene group, or an amino group.

Though there is no particular limitation for the L1, a direct bond or a group described below, which is a combination of the particularly preferred groups described above is suitably used.

(In the formula, the dashed line portion indicates the portion to be bonded to the photochromic moiety PC and X1.)

[CF 8]

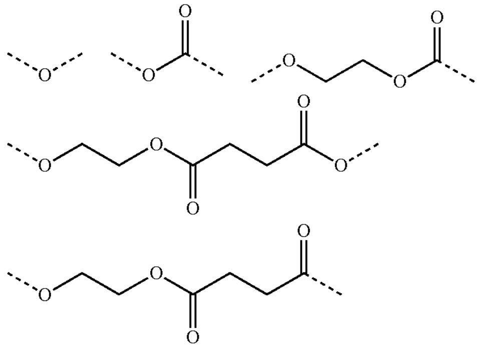

-continued

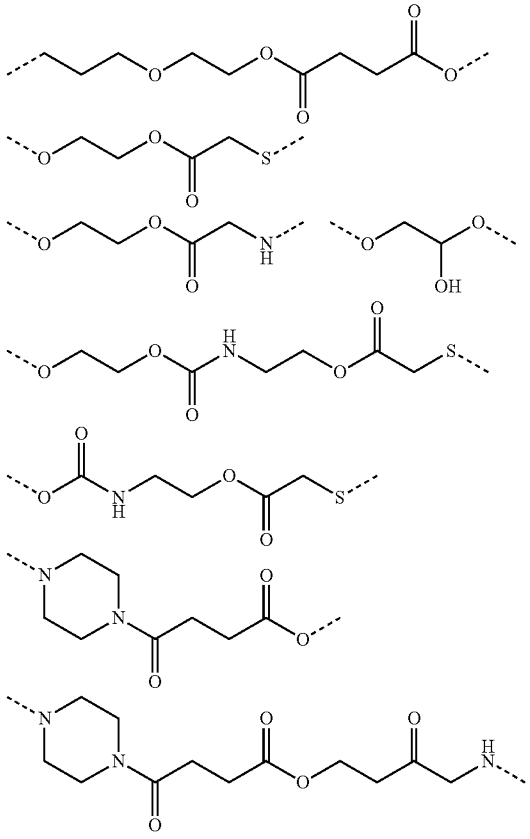

L1 is preferably a divalent bond represented by the following formula (3').

[CF 9]

$$-\left(V1\right)_{\alpha}\left(V2\right)_{\beta}\left(V3\right)_{\gamma}\left(V4\right)_{\delta}- \quad (3')$$

In the formula (3'), V1, V2, V3 and V4 are each independently an oxygen atom, a sulfur atom, an amino group, a substituted amino group, a dimethylsilylene group, a dimethylsilyleneoxy group, a carbonyl group, a carbonyloxy group, an aminocarbonyloxy group, an aminoxycarbonyl group, an alkylene group having 1 to 10 carbon atoms, an oxyalkylene group having 1 to 10 carbon atoms, an oxyalkylene group having a hydroxyl group at a substituent and having 1 to 10 carbon atoms, a dioxyalkylene group having 1 to 10 carbon atoms, a carbonyl alkylene group having 2 to 10 carbon atoms, a dicarbonyl alkylene group having 3 to 10 carbon atoms, a thioalkylene group having 1 to 10 carbon atoms, an aminoalkylene group having 1 to 10 carbon atoms, an oxycarbonyl alkylene group having 2 to 10 carbon atoms, a carbonyloxyalkylene group having 2 to 10 carbon atoms, an aminocarbonyloxyalkylene group having 2 to 10 carbon atoms, a cycloalkylene group having 3 to 10 carbon atoms, a cycloalkylene carbonyl group having 4 to 10 carbon atoms, a cycloalkylene oxycarbonyl group having 4 to 10 carbon atoms, a cycloalkylene carbonyloxy group having 4 to 10 carbon atoms, a heterocycloalkylene group having 1 to 10 carbon atoms, or a heterocycloalkylene carbonyl group having 2 to 10 carbon atoms.

α, β, γ and δ are each 0 or 1. α+β+γ+δ is 1 or more and 4 or less. The bond indicated with a dashed line extending from V4 is bonded to X1. The bond indicated with a solid line extending from V1 is bonded to PC.

<L2, L3>

L2 is a direct bond or an m+1 valent bond that binds two different types of oligomeric chain groups X1 and X2.

Among them, a group represented by the following formula (4) is preferred.

[CF 10]

$$-(Y3-(A2)_q-Y4)_r- \quad (4)$$

(In the formula,

- Y3 and Y4 are divalent groups, each independently being a direct bond or a group comprising —O—, —S—, an amino group, a substituted amino group, a carbonyl group, and a combination thereof, or alternatively a substituted silylene group;
- A2 is an m-valent group, which is a direct bond (only when m=1) or a hydrocarbon group having 1 to 10 carbon atoms that may have a substituent;
- q is an integer of 1 to 3, and r is an integer of 1 to 5;
- when q is 2 or more, groups of a plurality of q may be the same as or different from each other; and
- when r is 2 or more, groups of a plurality of r may be the same as or different from each other.)

Among them, the following groups are particularly preferred.

A2 is preferably a direct bond, or a methylene group, an ethylene group, a propylene group, a butylene group, a pentylene group, a hexylene group, or a heptylene group, which has a substituent selected from an alkoxyl group, a methyl group, an ethyl group, a propyl group, or a hydroxyl group, or a group of the following formula.

[CF 11]

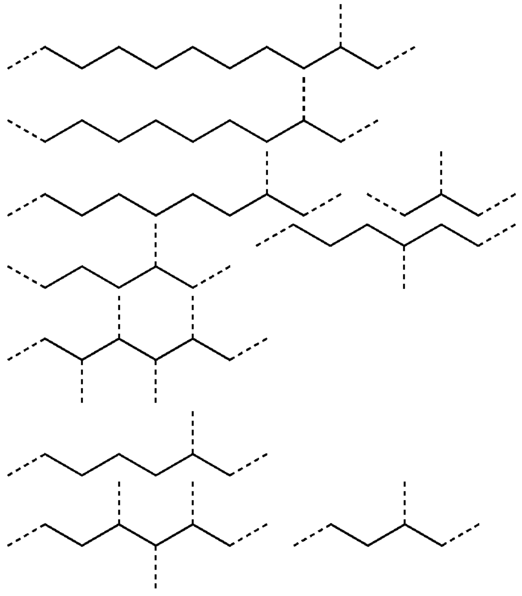

-continued

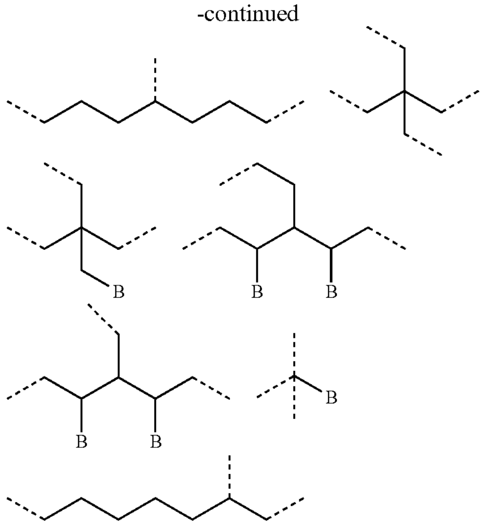

(In the formula, the dashed line portion indicates a bond with Y3 or Y4, and B is a hydrogen atom or a substituent selected from a methyl group, an ethyl group, a propyl group, a hydroxyl group, or an alkoxyl group.)

Y3 and Y4 are each preferably a direct bond, or a group comprising —O—, —S—, a carbonyl group, an ester group, a thioester group, an amide group, a urethane group, a thioletane group, a dimethylsilylene group, or an amino group.

L3 is a direct bond or an l+1 valent bond that binds two different types of oligomeric chain groups X2 and X3.

Among them, a group represented by the following formula (5) is preferred.

[CF 12]

$$-(Y5-(A3)_s-Y6)_t- \quad (5)$$

(In the formula,

- Y5 and Y6 are divalent groups, each independently being a direct bond or a group comprising —O—, —S—, an amino group, a substituted amino group, a carbonyl group or a combination thereof, or a substituted silylene group;
- A3 is an l-valent group and is a direct bond (only when l=1) or a hydrocarbon group having 1 to 10 carbon atoms that may have a substituent;
- s is an integer of 1 to 3, and t is an integer of 1 to 5;
- when s is 2 or more, groups of a plurality of s may be the same as or different from each other; and
- when t is 2 or more, groups of a plurality of t may be the same as or different from each other.

Among them, the following groups are particularly preferred.

A3 is preferably a direct bond, or a methylene group, an ethylene group, a propylene group, a butylene group, a pentylene group, a hexylene group, or a heptylene group, which has a substituent selected from an alkoxyl group, a methyl group, an ethyl group, a propyl group, or a hydroxyl group, or a group of the following formula.

[CF 13]

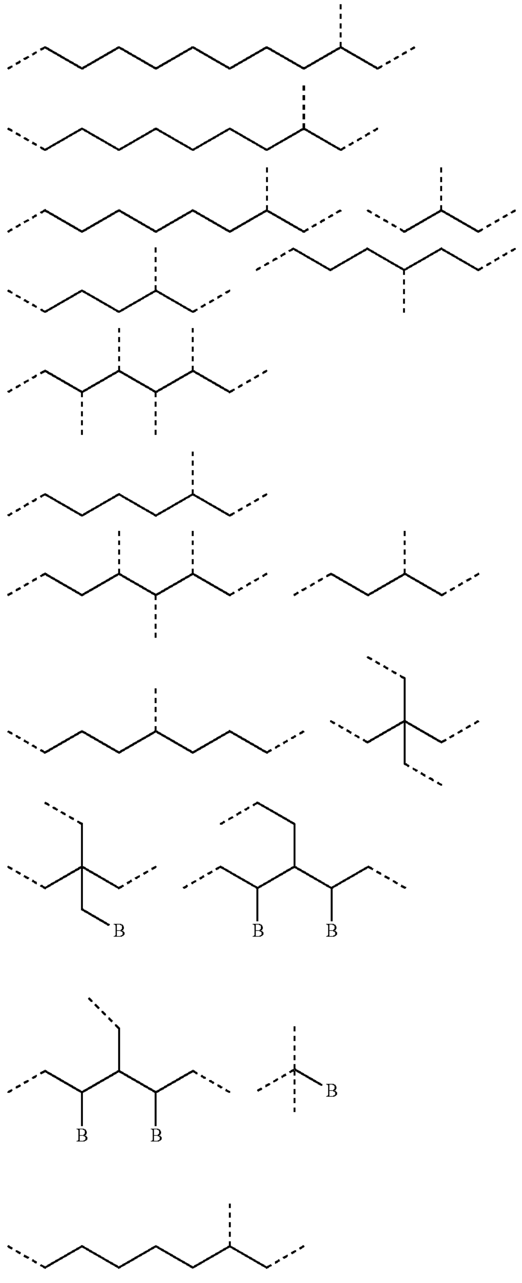

(In the formula, the dashed line portion indicates a bond with Y5 or Y6, and B is a hydrogen atom or a substituent selected from a methyl group, an ethyl group, a propyl group, a hydroxyl group, or an alkoxyl group.)

Y5 and Y6 are each preferably a direct bond, or a group comprising —O—, —S—, a carbonyl group, an ester group, a thioester group, an amide group, a urethane group, a thioletane group, a dimethylsilylene group, or an amino group.

Though there is no particular limitations for L2 and L3, when m and l are 1, direct bonds or groups described below as a combination of the particularly preferred groups described above are suitably used.

(In the formula, the dashed line portion indicates a bond to X1, X2, or X3.)

[CF 14]

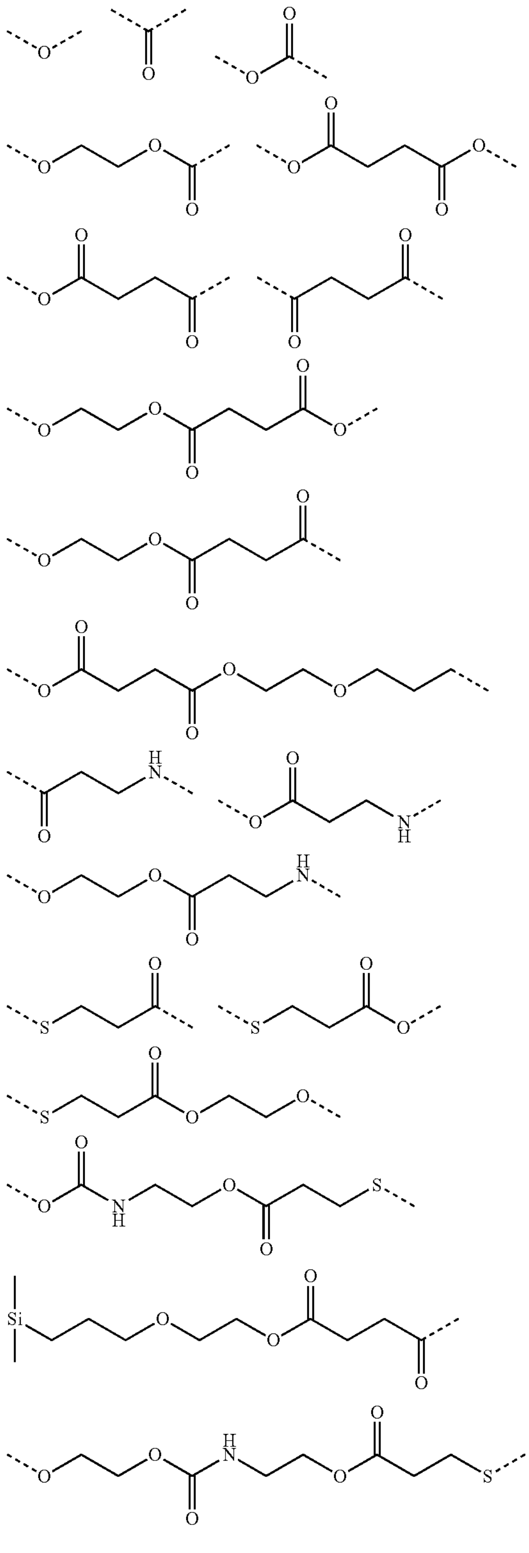

When m and l are 2 or more, the following examples are suitably used.

(In the formula, the dashed line portion indicates a bond to X1, X2, or X3.)
[CF 15]
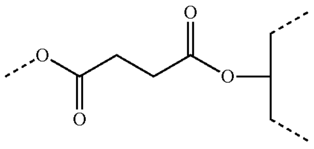
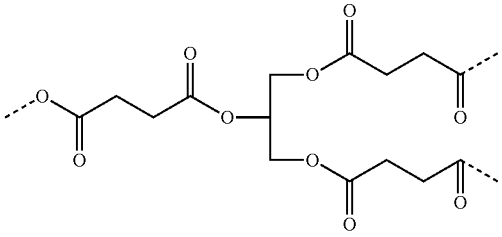
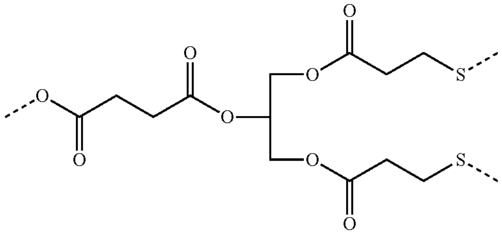
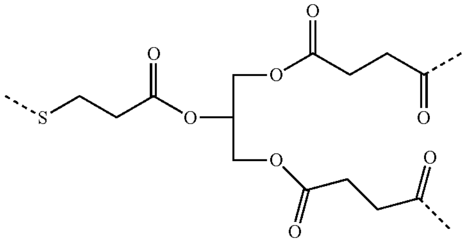
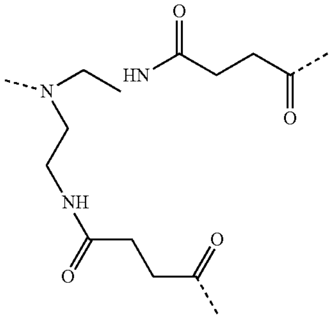
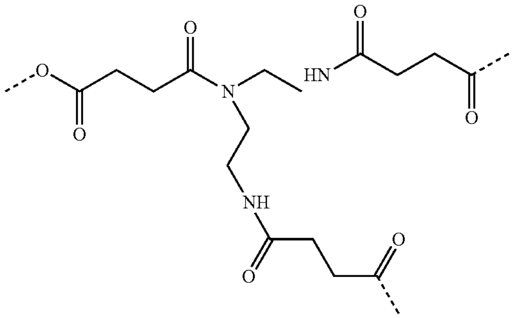
-continued
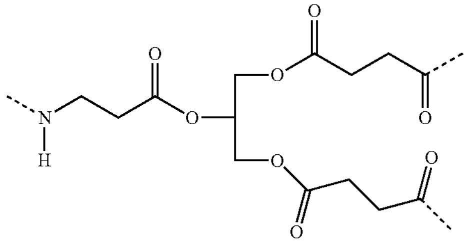
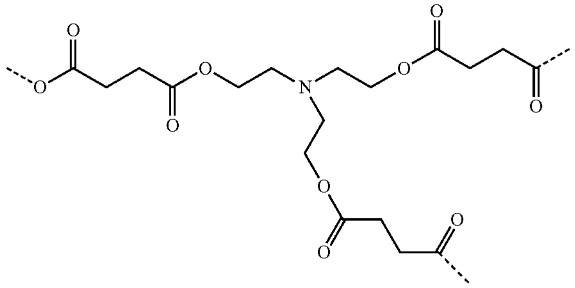
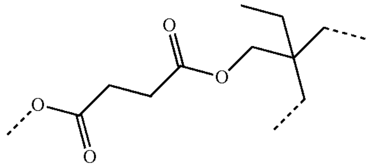
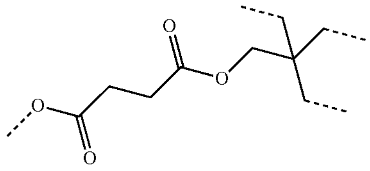
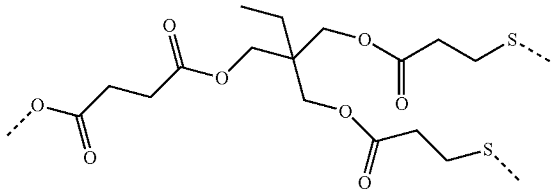
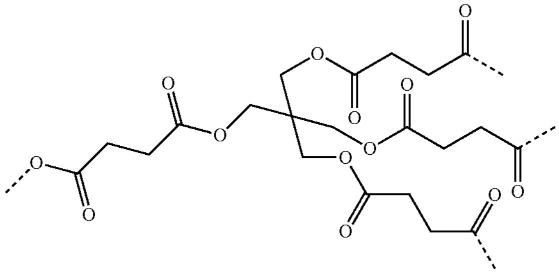
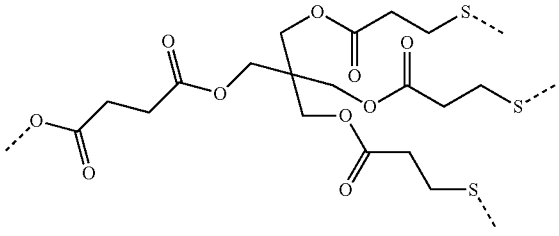

L2 and L3 each may be a divalent bond represented by the following formula (4').

[CF 16]

$$---(V5)_{\varepsilon}-(V6)_{\zeta}-(V7)_{\eta}-(V8)_{\theta}- \quad (4')$$

In the formula (4'), V5, V6, V7 and V8 are each independently an oxygen atom, a sulfur atom, an amino group, a substituted amino group, a dimethylsilylene group, a dimethylsilyleneoxy group, a carbonyl group, a carbonyloxy group, an aminocarbonyloxy group, an aminoxycarbonyl group, an alkylene group having 1 to 10 carbon atoms, an oxyalkylene group having 1 to 10 carbon atoms, an oxyalkylene group having a hydroxyl group as a substituent and having 1 to 10 carbon atoms, a dioxyalkylene group having 1 to 10 carbon atoms, a carbonyl alkylene group having 2 to 10 carbon atoms, a dicarbonyl alkylene group having 3 to 10 carbon atoms, a thioalkylene group having 1 to 10 carbon atoms, an aminoalkylene group having 1 to 10 carbon atoms, an oxycarbonyl alkylene group having 2 to 10 carbon atoms, a carbonyloxyalkylene group having 2 to 10 carbon atoms, an aminocarbonyloxyalkylene group having 2 to 10 carbon atoms, a cycloalkylene group having 3 to 10 carbon atoms, a cycloalkylene carbonyl group having 4 to 10 carbon atoms, a cycloalkylene oxycarbonyl group having 4 to 10 carbon atoms, a cycloalkylene carbonyloxy group having 4 to 10 carbon atoms, a heterocycloalkylene group having 1 to 10 carbon atoms, or a heterocycloalkylene carbonyl group having 2 to 10 carbon atoms.

$\varepsilon$, $\zeta$, $\eta$ and $\theta$ are each 0 or 1. $\varepsilon+\zeta+\eta+\theta$ is 1 or more and 4 or less. For L2, the bond indicated with a dashed line extending from V5 is bonded to X1 and the bond indicated with a solid line extending from V8 is bonded to X2. For L3, the bond indicated with a dashed line extending from V5 is bonded to X2 and the bond indicated with a solid line extending from V8 is bonded to X3.

L2 and L3 each may be a trivalent bond represented by the following formula (5').

[CF 17]

(5')

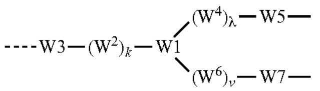

In the formula (5'), W1 is CH, CW8, or a trivalent group that is a nitrogen atom. W8 is a linear or branched alkyl group having 1 to 10 carbon atoms.

W2, W3, W4, W5, W6, and W7 are each independently an oxygen atom, a sulfur atom, an amino group, a substituted amino group, a dimethylsilylene group, a dimethylsilyleneoxy group, a carbonyl group, a carbonyloxy group, an aminocarbonyloxy group, an aminoxycarbonyl group, an alkylene group having 1 to 10 carbon atoms, an oxyalkylene group having 1 to 10 carbon atoms, an oxyalkylene group having a hydroxyl group as a substituent and having 1 to 10 carbon atoms, a dioxyalkylene group having 1 to 10 carbon atoms, a carbonyl alkylene group having 2 to 10 carbon atoms, a dicarbonyl alkylene group having 3 to 10 carbon atoms, a thioalkylene group having 1 to 10 carbon atoms, an aminoalkylene group having 1 to 10 carbon atoms, an oxycarbonyl alkylene group having 2 to 10 carbon atoms, a carbonyloxyalkylene group having 2 to 10 carbon atoms, an aminocarbonyloxyalkylene group having 2 to 10 carbon atoms, a cycloalkylene group having 3 to 10 carbon atoms, a cycloalkylene carbonyl group having 4 to 10 carbon atoms, a cycloalkylene oxycarbonyl group having 4 to 10 carbon atoms, a cycloalkylene carbonyloxy group having 4 to 10 carbon atoms, a heterocycloalkylene group having 1 to 10 carbon atoms, or a heterocycloalkylene carbonyl group having 2 to 10 carbon atoms.

$\kappa$, $\lambda$, and ß are each 0 or 1.

For L2, the bond indicated with a dashed line extending from W3 is bonded to X1, and the bonds indicated with solid lines extending from W5 and W7 are bonded to X2. For L3, the bond indicated with a dashed line extending from W3 is bonded to X2, and the bonds indicated with solid lines extending from W5 and W7 are bonded to X3.

L2 and L3 each may be a tetravalent bond represented by the following formula (6').

[CF 18]

(6')

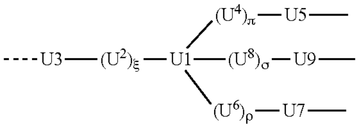

In the formula (6'), U1, U2, U3, U4, U5, U6, U7, U8 and U9 are each independently an oxygen atom, a sulfur atom, an amino group, a substituted amino group, a dimethylsilylene group, a dimethylsilyleneoxy group, a carbonyl group, a carbonyloxy group, an aminocarbonyloxy group, an aminoxycarbonyl group, an alkylene group having 1 to 10 carbon atoms, an oxyalkylene group having 1 to 10 carbon atoms, an oxyalkylene group having a hydroxyl group as a substituent and having 1 to 10 carbon atoms, a dioxyalkylene group having 1 to 10 carbon atoms, a carbonyl alkylene group having 2 to 10 carbon atoms, a dicarbonyl alkylene group having 3 to 10 carbon atoms, a thioalkylene group having 1 to 10 carbon atoms, an aminoalkylene group having 1 to 10 carbon atoms, an oxycarbonyl alkylene group having 2 to 10 carbon atoms, a carbonyloxyalkylene group having 2 to 10 carbon atoms, an aminocarbonyloxyalkylene group having 2 to 10 carbon atoms, a cycloalkylene group having 3 to 10 carbon atoms, a cycloalkylene carbonyl group having 4 to 10 carbon atoms, a cycloalkylene oxycarbonyl group having 4 to 10 carbon atoms, a cycloalkylene carbonyloxy group having 4 to 10 carbon atoms, a heterocycloalkylene group having 1 to 10 carbon atoms, or a heterocycloalkylene carbonyl group having 2 to 10 carbon atoms.

$\zeta$, $\pi$, $\rho$ and $\sigma$ are each 0 or 1.

For L2, the bond indicated with a dashed line extending from U3 is bonded to X1, and the bonds indicated with solid lines extending from U5, U7 and U9 are bonded to X2. For L3, the bond indicated with a dashed line extending from U3 is bonded to X2, and the bonds indicated with solid lines extending from U5, U7 and U9 are bonded to X3.

<Specific Examples of Photochromic Compounds>

The photochromic compounds are shown by the following formulae and as exemplified compounds in the Examples, but they are merely examples and the photochromic compound is not limited thereto.

In the formulae, x, y, z denote the number of repeating units and are selected from 3 to 200. The oligomeric chain group is represented by a number average molecular weight because it usually has a plurality of molecular weights. Therefore, x, y, and z can take values other than integers. In addition, x, y, and z may be different from each other or may be the same. Note that "Me" in the formula indicates a methyl group.

[CF 19]
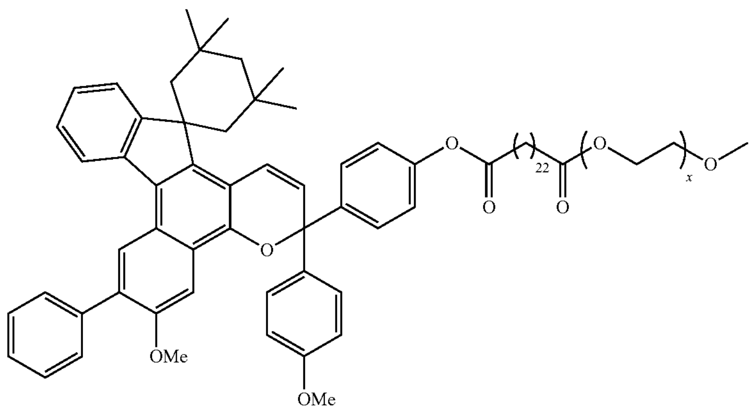
[CF 20]
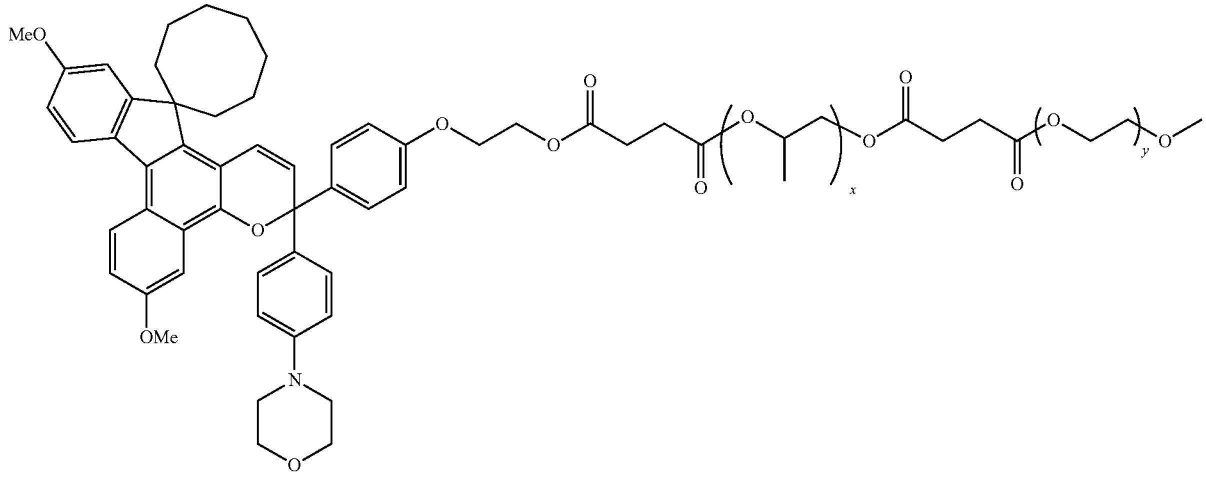
[CF 21]
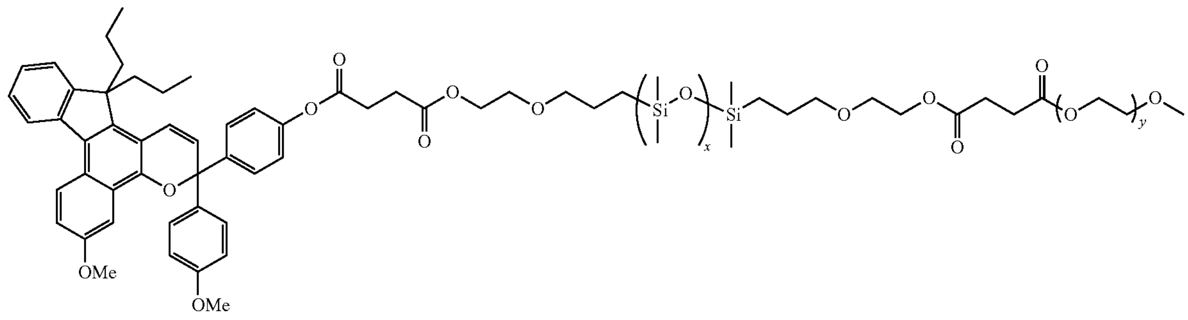

-continued
[CF 22]
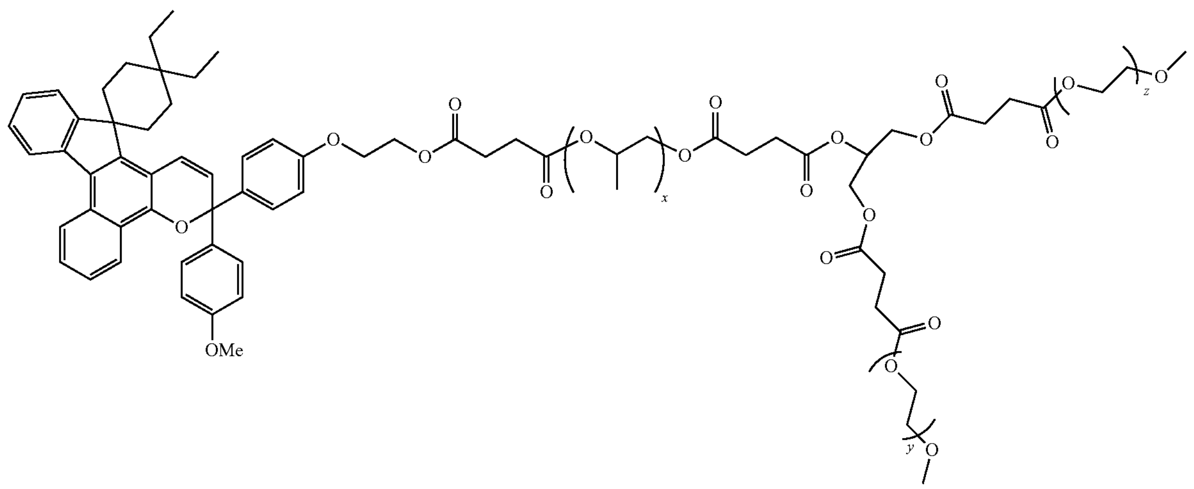
[CF 23]
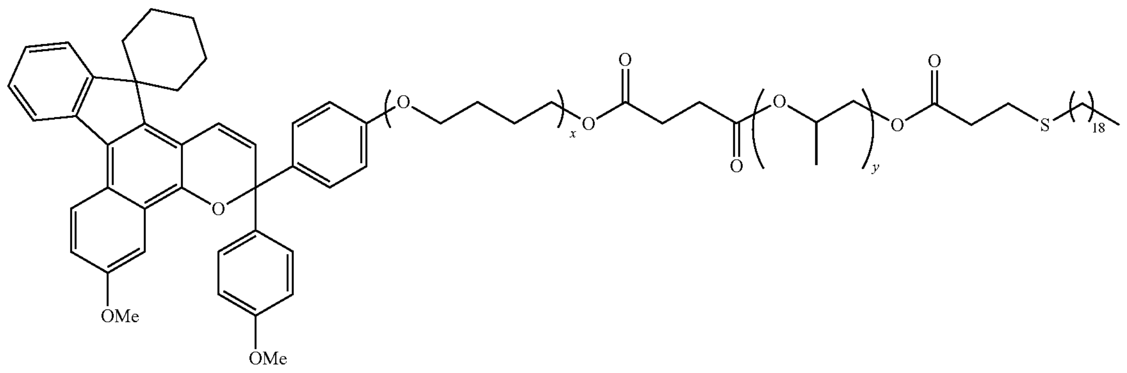
[CF 24]
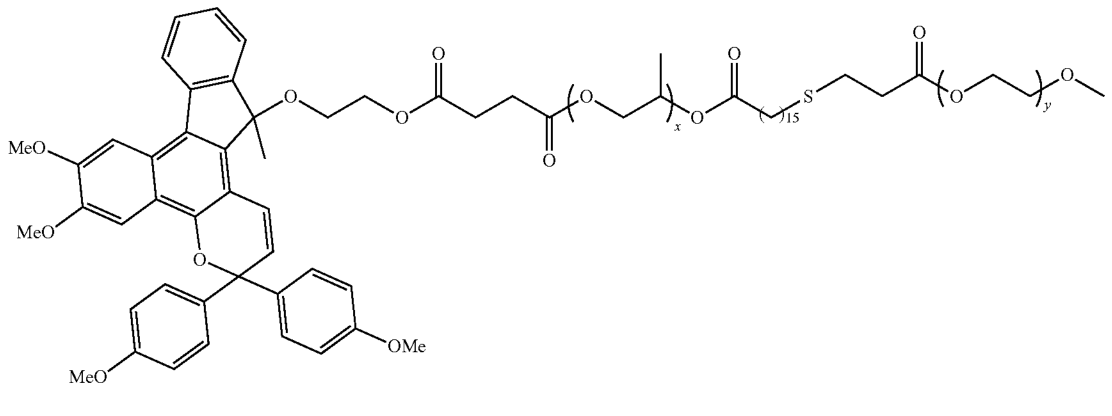

-continued

[CF 25]

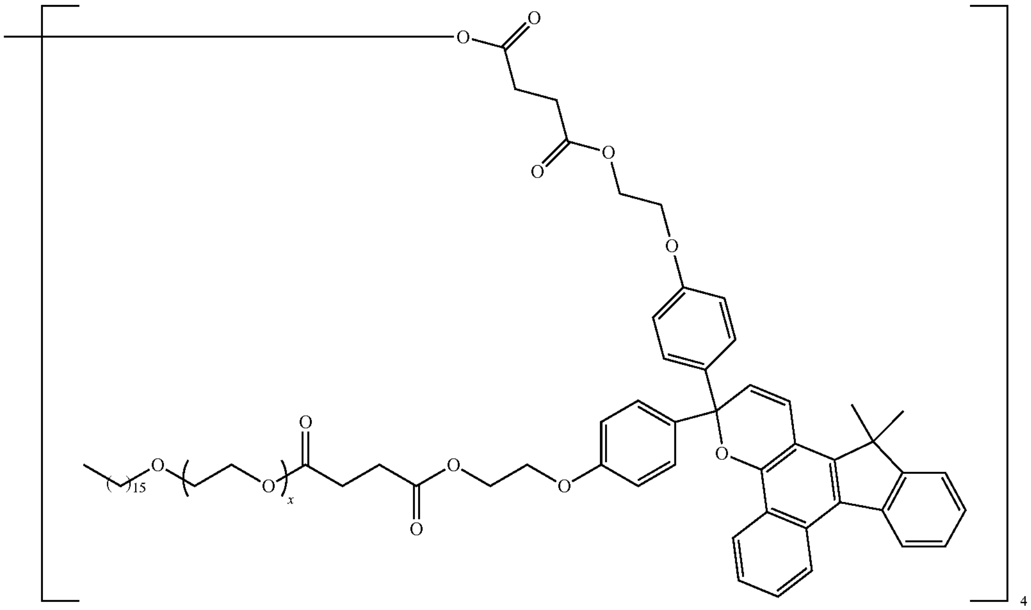

<Method for Producing Photochromic Compound>

The photochromic compound may be produced by any synthetic method. A representative example of methods for producing a photochromic compound will be described, but the present invention is not limited thereto.

A synthesis of a photochromic compound of the above formula (1) will be described for instance.

A method similar to that described in International Publication No. WO2019/013249 pamphlet can be suitably used. A block polymer having a reactive substituent such as an OH group at its terminal is previously synthesized.

Apart from the block polymer having a reactive substituent, a compound having a photochromic moiety is synthesized. Into the photochromic moiety, at least one group capable of reacting with the reactive substituent is introduced. Preferably, this group is a group to form the L1.

Then, the reactive substituent of the block polymer and the group capable of forming L1 may be reacted to produce a photochromic compound. Alternatively, the photochromic moiety and the reactive substituent may be directly reacted (in this case, L1 is a direct bond).

There is no particular limitation for the group capable of forming the L1 with the reactive substituent of the block polymer compound. It is also possible to convert an OH group possessed by the block polymer compound into another reactive group by a known method, and then, to allow the reactive group to react with a compound having a photochromic moiety into which a group that can react with the reactive group has been introduced. For instance, the L1 can be formed by performing an esterification reaction with a photochromic compound (moeity) having a carboxylic acid at its terminal. Specifically, the esterification reaction can proceed by stirring in a solvent such as toluene or the like in the presence of a mineral acid such as sulfuric acid or hydrochloric acid, an organic acid such as an aromatic sulfonic acid, or a Lewis acid such as boron fluoride ether, while heating, if necessary, and then, by removing the generated water by azeotropy. In the esterification reaction, examples of methods of removing water include a method of removing water with a desiccant such as anhydrous magnesium sulfate or molecular sieves or a method of removing water in the presence of a dehydrating agent represented by dicyclohexylcarbodiimide or the like.

It is also possible to form the L1 by carrying out an esterification reaction with a compound having a carboxylic acid halide at its terminal. In a specific example of a method that can be employed therefor, in the presence of a base such as pyridine or dimethylaniline, in an ether-based solvent such as tetrahydrofuran, stirring is performed while heating if necessary, and hydrogen halide generated in the process is removed.

Alternatively, the L1 can be formed by carrying out an esterification reaction with a compound having an acid anhydride at its terminal. Specifically for instance, a method of stirring in a solvent such as toluene in the presence of a catalyst such as sodium acetate or pyridine, while heating if necessary, can be employed.

Alternatively, the L1 can be formed by carrying out a urethanization reaction with a compound having an NCO group at its terminal. Specifically for instance, a method of stirring in a solvent such as toluene or without using any solvent in the presence of an amine-based catalyst such as triethylenediamine or a tin-based catalyst such as dibutyltin dilaurate, while heating if necessary, can be employed.

Alternatively, the L1 can be formed by carrying out a Michael addition reaction with a compound having an SH group or a primary or secondary amino group at its terminal. Specifically for instance, a method of stirring in a solvent such as toluene or without using any solvent in the presence of a base such as a tertiary amine like triethylene amine or a metal alkoxide in a catalytic amount or a solid catalyst such as alumina, while heating if necessary, can be employed.

In an alternative method for synthesizing photochromic compound, a polymer having a photochromic moiety and further having a reactive substituent such as an OH group at its terminal is synthesized in advance. In addition, a polymer in which a group capable of reacting with the reactive substituent is introduced is synthesized separately from a polymer having a photochromic moiety and having a reactive substituent. Preferably, this group is a group to form the L2. Then, a reactive substituent of a polymer having a photochromic moiety and having a reactive substituent may be reacted with a group capable of forming L2 to form a block polymer, thereby producing a photochromic compound. The group capable of forming L2 with the reactive substituent is not particularly limited. Of course, as described above, it is also possible to convert an OH group into another reactive group by a known method, and then react the reactive group with a polymer into which a group capable of reacting is introduced, thereby forming a block polymer.

The photochromic compound represented by the above formula (2) also can be produced by using the above-described method.

<Identification of Photochromic Compound>

A photochromic compound is usually present as a solid or a viscous liquid at ordinary temperature and ordinary pressure and can be confirmed by the following means. Specifically, it is confirmed that there are no by-products such as a raw material compound and a colored content other than the photochromic compound, by a separation operation such as thin-layer chromatography, silica gel column chromatography, high performance liquid chromatography, or gas chromatography.

By measuring the obtained photochromic compound in a proton nuclear magnetic resonance spectrum ($^1$H-NMR), a peak based on an aromatic proton and an alkene proton around δ: 5.0 to 9.0 ppm, and a peak based on protons of an alkyl group and an alkylene group around δ: 1.0 to 4.0 ppm appear. By comparing the respective spectral intensities relative to each other, it is possible to know the number of protons of each bonding group.

The photochromic compound is well soluble in ordinary organic solvents such as toluene, chloroform, tetrahydrofuran, and the like. When a photochromic compound represented by the above formula (1) or (2) is dissolved in such a solvent, usually, the solution is almost colorless and transparent, and exhibits a good photochromic action that rapidly develops color when irradiated with sunlight or ultraviolet rays, and quickly returns to its original colorless state when blocked from light.

<Method of Using Photochromic Compound>

The photochromic compound can be widely used as a photochromic material (photochromic optical article), and can be utilized as various storage materials as a replacement for silver salt photosensitive materials, and various storage materials, for instance, copying materials, photoreceptors for printing, memory materials for cathode ray tubes, photosensitive materials for lasers, and photosensitive materials for holography. In addition, a photochromic material using a photochromic compound can be used as a photochromic optical article such as a photochromic lens material, an optical filter material, a display material, a photometer, or a decoration. The photochromic optical article can be produced, for instance, by curing a photochromic curable composition containing a photochromic compound and a polymerizable compound as described later, or can be formed as an optical article by laminating a surface of a base material such as a plastic lens with a cured layer in which a photochromic compound is dispersed, for instance.

Since the photochromic compound exhibits excellent photochromic properties even in a solid matrix, it can be used in a state dispersed in a polymer solid matrix, or can be formed into a polymer molded body in which the photochromic compound is dispersed therein. As the dispersion method, any methods known per se can be used. An example thereof is a method in which a photochromic compound and a solid matrix such as a thermoplastic resin are kneaded in a molten state so that the photochromic compound is dispersed in a solid matrix. In another method, a polymer photochromic compound is dissolved in a polymerizable compound, and then, a polymerization catalyst is added and the photochromic compound is cured by heat or light to disperse in a cured body. In an alternative method, the photochromic compound is dispersed in a solid matrix by dyeing a polymer photochromic compound on a surface of the solid matrix.

Examples of the solid matrices preferred from the optical viewpoint are polyacrylates, polymethacrylates, poly($C_1$-$C_{12}$)alkyl methacrylates, polyoxy(alkylene methacrylate), poly(alkoxylated phenol methacrylate), cellulose acetate, cellulose triacetate, cellulose acetate propionate, cellulose acetate butylate, poly(vinyl acetate), poly(vinyl alcohol), poly(vinyl chloride), poly(vinylidene chloride), poly(vinylpyrrolidone), poly(meth)acrylamide, poly(dimethylacrylamide), poly(hydroxyethyl methacrylate), poly(meth) acrylic acid), thermoplastic polycarbonates, polyesters, polyurethanes, polythiourethanes, poly(ethylene terephthalate), polystyrene, and poly(α-methylstyrene).

For instance, when a photochromic compound is used for a photochromic lens, the method is not particularly limited as long as uniform dimming performance can be obtained. Examples thereof include a method of sandwiching a polymer film formed by uniformly dispersing a photochromic compound in a lens, or a method of dispersing a photochromic compound in a polymerizable compound and polymerizing the photochromic compound by a predetermined method, or a method of dissolving the photochromic compound in a silicone oil or the like to impregnate the lens surface at 150 to 200° C. for 10 to 60 minutes, and further coating the surface with a curable material to form a photochromic lens. In another method used therefor, the polymer film is applied to a lens surface, and the surface is coated with a curable substance to form a photochromic lens. It is also possible to apply a coating agent comprising a photochromic compound curable composition containing a photochromic compound, which is described later, to the surface of the lens base material so as to cure the coating film. At this time, the lens base material may be subjected in advance to a surface treatment, for instance, a surface treatment with an alkaline solution or a plasma treatment. It is also possible to apply a primer to improve the adhesion between the base material and the coating film in combination with or without these surface treatment.

<Photochromic Curable Composition>

By blending a photochromic compound in the polymerizable compound, it can be used as a photochromic curable composition. The photochromic compound may be used alone, but may also be used in combination with other photochromic compounds depending on the purpose, for instance, in order to obtain various color tones required for a photochromic lens. As the photochromic compound to be combined, any known photochromic compounds can be used without any substantial limitations. Examples thereof include naphthopyran, spirooxazine, spiropyran, flugide, and flugimide. Among them, naphthopyran is preferred from the viewpoint of keeping a uniform color tone at the time of color development/fading and preventing/reducing the color shift at the time of color development/fading accompanying the deterioration of the photochromic compound. From the viewpoint of preventing/reducing the initial coloring, naphthopyran is preferred, and indenonaphthopyran is particularly preferred. In addition, from the viewpoint of preventing/reducing the color shift of the color tone at the time of color development/fading due to the difference in the matrix dependency, it is preferable that the other photochromic compound is also a photochromic compound having an oligomeric chain group. Further, in a case where a photochromic compound having an oligomeric chain group is used, it is most preferable to use a plurality of kinds of photochromic compounds for adjusting the color tone from the viewpoint of preventing/reducing white turbidity of a cured body.

For the photochromic curable composition, the amount of the photochromic compound to be blended is not particularly limited, and may be appropriately selected in consideration of the color development intensity of the photochromic compound and the thickness of the obtained photochromic cured body. Specifically, the photochromic compound containing a polymer photochromic compound is preferably set to 0.0001 to 30 parts by mass, more preferably 0.0003 to 20 parts by mass, and most preferably 0.0005 to 10 parts by mass, relative to 100 parts by mass of the polymerizable compound.

Since the color development intensity of the photochromic cured body relies on the thickness of the cured body, it is particularly important to take the thickness into consideration. For instance, when a thin film of 100 μm or less is shaped from a photochromic curable composition, it is preferable to adjust the color tone using 0.001 to 10 parts by mass of a photochromic compound containing a polymer photochromic compound relative to 100 parts by mass of the polymerizable compound. In production of a photochromic cured body having a thickness 1 mm or more, it is preferable to adjust the color tone by using 0.0005 to 5 parts by mass of a photochromic compound containing a polymer photochromic compound relative to 100 parts by mass of the polymerizable compound.

<Polymerizable Compound>

As described above, the photochromic compound can be used as a photochromic curable composition in combination with a polymerizable compound. Examples of the polymerizable compound include a urethane- or a urea-based polymerizable compound capable of forming a urethane bond, a urea bond and the like, a radically polymerizable compound, an epoxy-based polymerizable compound, and the like. Although these polymerizable compounds are not particularly limited, for instance, a polymerizable compound described in WO2018-235771 can be suitably used. Among these, a urethane-based polymerizable compound or a radically polymerizable compound described below is suitably used.

(Urethane-Based Polymerizable Compound)

As the urethane-based polymerizable compound, a composition containing an iso(thio)cyanate compound and a compound having an active hydrogen can be suitably used. The iso(thio)cyanate compound refers to a compound having an isocyanate group or an isothiocyanate group, and may be a compound having both the isocyanate group and the isothiocyanate group.

Although any known iso(thio)cyanate compound can be used without any particular limitation, it is preferable to include a polyisocyanate group having a polyiso(thio)cyanate group that has at least two iso(thio)cyanate groups in one molecule, and it is particularly preferable to include a polyiso(thio)cyanate compound having an aromatic ring such as m-xylene diisocyanate or 4,4'-diphenylmethane diisocyanate, or an aliphatic polyiso(thio)cyanate compound such as norbornane diisocyanate or dicyclohexylmethane-4,4'-diisocyanate.

The compound having active hydrogen can be used without any particular limitation, but is preferably a compound having an amino group and/or a hydroxyl group and/or a thiol group. In particular, it is preferable to include a polyfunctional compound having two or more active hydrogens in one molecule. Specific examples thereof include bifunctional amine compounds such as isophoronediamine, bis-(4-aminocyclohexyl)methane, and norbornanediamine; polyfunctional thiol compounds such as dipentaerythritol hexakis(3-mercaptopropionate), trimethylol propanetris(3-mercaptopropionate), pentaerythritol tetrakis (3-mercaptopropionate), and 4-mercaptomethyl-3,6-dithiaoctanedithiol; and polyfunctional alcohols such as trimethylolpropane and pentaerythritol. Compositions comprising them are preferred.

In consideration of the durability of the obtained photochromic cured body, it is preferable to use an active hydride having at least one piperidine structure, a hindered phenol structure, a triazine structure, or a benzotriazole structure in the molecule.

(Radically Polymerizable Compound)

The radically polymerizable compound can be classified into a polyfunctional radically polymerizable compound and a monofunctional radically polymerizable compound, and each of them can be used alone or in combination. Examples of the radically polymerizable substituent include a group having an unsaturated double bond, that is, a vinyl group (including a styryl group, a (meth)acrylic group, an allyl group, and the like).

A polyfunctional radically polymerizable compound refers to a compound having two or more radically polymerizable substituents in the molecule. This polyfunctional radically polymerizable compound can be classified into a first polyfunctional radically polymerizable compound having 2 to 10 radically polymerizable substituents and a second polyfunctional radically polymerizable compound having more than 10 radically polymerizable substituents.

The first polyfunctional radically polymerizable compound is not particularly limited, but more preferably has 2 to 6 radically polymerizable substituents. Specific examples of the first polyfunctional radical polymerizable compounds include: polyfunctional (meth)acrylate compounds such as ethylene glycol di(meth)acrylate, diethylene glycol di(meth) acrylate, triethylene glycol di(meth)acrylate, tetraethylene glycol di(meth)acrylate, ethylene glycol bisglycidyl(meth) acrylate, bisphenol A di(meth)acrylate, 2,2-bis(4-(meth) acryloyloxyethoxyphenyl)propane, and 2,2-bis(3,5-dibromo-4-(meth)acryloyloxyphenyl)propane; polyfunctional allylic compounds such as diallyl phthalate, diallyl terephthalate, diallyl isophthalate, diallyl tartrate, diallyl epoxy succinate, diallyl fumarate, diallyl chlorendate, diallyl hexaphthalate, diallyl carbonate, allyl diglycol carbonate, and trimethylolpropane triallyl carbonate; polyfunctional thio(meth)acrylate compounds such as 1,2-bis(methacryloylthio)ethane, bis(2-acryloylthioethyl)ether, and 1,4-bis (methacryloylthiomethyl)benzene; and, vinyl compounds such as divinylbenzene.

Examples of the second polyfunctional radically polymerizable compounds are compounds having a relatively large molecular weight such as a silsesquioxane compound having a radically polymerizable substituent and a polyrotaxane compound having a radically polymerizable substituent.

A monofunctional radically polymerizable compound refers to a compound having one or more radically polymerizable substituents in the molecule. Examples of the monofunctional radically polymerizable compound include: unsaturated carboxylic acids such as acrylic acid, methacrylic acid, and maleic anhydride; (meth)acrylic acid ester compounds such as methyl (meth)acrylate, benzyl methacrylate, phenyl methacrylate, 2-hydroxyethyl methacrylate, glycidyl (meth)acrylate, R-methylglycidyl (meth)acrylate, bisphenol A-monoglycidyl ether-methacrylate, 4-glycidyloxy methacrylate, 3-(glycidyl-2-oxyethoxy)-2-hydroxypropylmethacrylate, 3-(glycidyloxy-1-isopropyloxy)-2-hydroxypropylacrylate, and 3-glycidyloxy-2-hydroxypropyloxy)-2-hydroxypropylacrylate; fumaric acid ester compounds such as diethyl fumarate, and diphenyl fumarate; thioacrylic acid and thiomethacrylic acid ester compounds such as methylthioacrylate, benzylthioacrylate, and benzylthiomethacrylate; and vinyl compounds such as styrene, chlorostyrene, methylstyrene, vinylnaphthalene, α-methylstyrenedimer, and bromostyrene.

The radically polymerizable compound may be used alone or a plurality of types of the mixture may be used. In this case, relative to 100 parts by mass of the total of the radically polymerizable compound, the polyfunctional radically polymerizable compound is preferably set to 80 to 100 parts by mass, and the monofunctional radically polymerizable compound is preferably set to 0 to 20 parts by mass. Further preferably, the polyfunctional radically polymerizable compound is set to 90 to 100 parts by mass and the monofunctional radically polymerizable compound is set to 0 to 10 parts by mass. Furthermore, relative to 100 parts by mass of the total of the radically polymerizable compound, it is preferable to set the first polyfunctional radically polymerizable compound to 80 to 100 parts by mass, the second polyfunctional radically polymerizable compound to 0 to 20 parts by mass, and the monofunctional radically polymerizable compound to 0 to 20 parts by mass. Further preferably, the first polyfunctional radically polymerizable compound is set to 85 to 100 parts by mass, the second polyfunctional radically polymerizable compound to 0 to 10 parts by mass, and the monofunctional radically polymerizable compound to 0 to 10 parts by mass.

<Other Additives>

Various additives known per se may be blended as a polymerization modifier as needed in the photochromic curable composition within a range not impairing the effect. The examples include: stabilizers such as a mold release agent, an ultraviolet absorber, an infrared absorber, an ultraviolet stabilizer, an antioxidant, a coloring inhibitor, an antistatic agent, a fluorescent dye, a dye, a pigment, and a perfume; additives; solvents; leveling agents; and thiols such as t-dodecyl mercaptan.

Among them, an ultraviolet stabilizer is used suitably because the durability of the photochromic moiety can be improved. Known examples of the ultraviolet stabilizer include a hindered amine light stabilizer, a hindered phenol antioxidant, and a sulfur-based antioxidant. Examples of particularly suitable ultraviolet stabilizers include: bis(1,2,2,6,6-pentamethyl-4-piperidyl) sebacate; ADK-STAB LA-52, LA-57, LA-62, LA-63, LA-67, LA-77, LA-82, and LA-87, manufactured by ADEKA CORPORATION; 2,6-di-tert-butyl-4-methyl-phenol; ethylene bis(oxyethylene)bis[3-(5-tert-butyl-4-hydroxy-m-tolyl) propionate]; and IRGANOX 1010, 1035, 1075, 1098, 1135, 1141, 1222, 1330, 1425, 1520, 259, 3114, 3790, 5057, and 565, manufactured by Ciba Specialty Chemicals Inc.

Though the use amount of the ultraviolet stabilizer is not particularly limited as long as the effect is not impaired, it is usually 0.001 to 10 parts by mass, preferably 0.01 to 5 parts by mass, relative to 100 parts by mass of the photochromic curable composition.

In addition to the ultraviolet stabilizer, an ultraviolet absorber can also be used. As the ultraviolet absorber, any known absorbers can be used, and the examples include: a benzotriazole-based ultraviolet absorber, a triazine-based ultraviolet absorber, a benzophenone-based ultraviolet absorber, a cyanoacrylate-based ultraviolet absorber, a diphenylacrylate-based ultraviolet absorber, a phenol-based ultraviolet absorber, an oxanilide-based ultraviolet absorber, a malonic ester-based ultraviolet absorber, and a cinnamic ester-based ultraviolet absorber. Particularly preferred examples are a cyanoacrylate-based ultraviolet absorber, a benzophenone-based ultraviolet absorber, an oxanilide-based ultraviolet absorber, a malonic ester-based ultraviolet absorber, and a cinnamic ester-based ultraviolet absorber. Among them, an oxanilide-based ultraviolet absorber, a malonic ester-based ultraviolet absorber, and a cinnamic ester-based ultraviolet absorber are particularly preferred. These ultraviolet stabilizers are preferably used in an amount of 0.001 to 5 parts by mass relative to 100 parts by mass of the photochromic curable composition.

In the photochromic curable composition, a polymerizable compound other than those described above may be blended within a range not impairing the effect, and the blending ratio thereof may be appropriately determined depending on the application.

<Method of Using Photochromic Curable Composition; Photochromic Optical Article>

As for the photochromic curable composition, a cured body obtained by polymerization can be used as a photochromic optical article. The photochromic curable composition can be prepared by mixing a photochromic compound to be used, a polymerizable compound, an additive to be blended as required or the like, by a known method. Polymerization to prepare the cured body is carried out by radical polymerization, ring-opening polymerization, anionic polymerization or condensation polymerization, by irradiation with active energy rays such as ultraviolet rays, α-rays, β-rays, γ-rays, by heating, or a combination thereof, or the like. In other words, an appropriate polymerization means may be employed depending on the type of the polymerizable compound or the polymerization curing accelerator and the form of the cured body to be formed.

In the thermal polymerization of the photochromic curable composition, the temperature particularly affects the properties of the obtained cured body. Since this temperature condition is under the influences of the type and amount of the thermal polymerization initiator and the type of the polymerizable compound, any general limitations are not applicable. However, a method of starting polymerization at a relatively low temperature and slowly raising the temperature is suitable. Since the polymerization time varies depending on the respective factors as well as the temperature, it is preferable to determine an optimum time corresponding to these conditions in advance. Usually, it is preferable to select conditions so that the polymerization is completed in 2 to 48 hours.

In photopolymerization of the photochromic curable composition, among the conditions for polymerization, particularly UV intensity affects the properties of the obtained cured body. Though this radiation conditions cannot be limited usually because it is affected by the type and amount of the photopolymerization initiator and the type of the polymerizable monomer, it is usually preferable to select a condition so that UV rays of 50 to 500 $mW/cm^2$ are irradiated at a wavelength of 365 nm for 0.5 to 5 minutes.

For instance, in a case of forming the cured body into a photochromic lens, any known methods described below can be employed as long as uniform dimming performance can be obtained.

In a case of manufacturing the photochromic lens by a kneading method, the above-mentioned photochromic curable composition is injected between glass molds held by an elastomer gasket or a spacer, and casting polymerization is conducted by heating in an air furnace or by irradiation with active energy rays like ultraviolet rays in accordance with the type of the polymerizable compound or the polymerization curing accelerator, whereby a photochromic optical article molded to a shape of a lens or the like can be obtained.

In a case of manufacturing a photochromic lens by a lamination method, a photochromic curable composition is appropriately dissolved in an organic solvent to prepare a coating liquid. The coating liquid is applied to a surface of an optical base material such as a lens base material by spin coating, dipping, or the like, and dried to remove the organic solvent. Then, polymerization is performed by UV irradiation, heating or the like in an inert gas such as nitrogen, whereby a photochromic lens having a photochromic layer formed on the surface of the optical base material can be obtained (coating method).

A photochromic lens having an optical base material with a photochromic layer formed thereon can be obtained also by a casting polymerization method using an inner mold. In this method, an optical base material like a lens base material is arranged to form a predetermined void, into which a photochromic curable composition is injected and polymerized by UV radiation, heating or the like (casting polymerization method).

In a case of forming the photochromic layer on the surface of the optical base material by the lamination method (coating method and casting polymerization method) as described above, it is also possible to enhance the adhesion between the photochromic layer and the optical base material by performing a chemical treatment with an alkaline solution, an acid solution or the like, or a physical treatment by a corona discharge, a plasma discharge, a polishing or the like, on the surface of the optical base material in advance. Of course, it is also possible to arrange a transparent adhesive resin layer on the surface of the optical base material.

In a case of manufacturing a photochromic lens by a binder method, first a photochromic sheet is produced by sheet molding using a photochromic curable composition. This is sandwiched between two transparent sheets (optical sheets) to perform the polymerization as described above, thereby obtaining a photochromic laminate having the photochromic layer as an adhesive layer.

In this case, it is also possible to employ a process of coating using a coating liquid prepared by dissolving a photochromic curable composition in an organic solvent, thereby producing a photochromic sheet.

A photochromic laminate thus prepared for instance is attached on the interior of a mold. Thereafter, a thermoplastic resin for an optical base material such as a lens (e.g., polycarbonate) is injection molded, whereby a photochromic lens of a predetermined shape having a photochromic laminate is obtained. This photochromic laminate can be also adhered to the surface of the optical base material by an adhesive or the like, thereby obtaining a photochromic lens.

In the case of producing a photochromic laminate as described above, it is preferable that a urethane- or a urea-based polymerizable compound, particularly a urethane-based polymerizable compound, is used as the polymerizable compound from the viewpoint of high adhesion to the optical base material, and is adjusted so that a polyurethane is formed.

The cured body obtained by polymerizing the above-described photochromic curable composition can exhibit excellent photochromic properties with high chromogenic density at high temperature.

A cured body obtained by polymerizing a photochromic curable composition can be subjected to a post-treatment in accordance with the application. Examples of the post-treatment include: dyeing with a dye like a disperse dye; formation of a hard coat film using a silane coupling agent or a hard coat agent including a sol as a main component such as silicon, zirconium, antimony, aluminum, tin, or tungsten; formation of a thin film by vapor deposition of a metal oxide such as $SiO_2$, $TiO_2$, or $ZrO_2$; an antireflection treatment with a thin film by coating an organic polymer; and an antistatic treatment.

EXAMPLES

The present invention will be described in detail by referring to Examples and Comparative Examples, but the present invention is not limited to the Examples.

The number of repeating units of the polymer shown in Examples is the average obtained by using a proton nuclear magnetic resonance spectrum.

Example 1

First Step 75 g (10 mmol) of polyethylene glycol monomethyl ether having a number average molecular weight of 750, 100 mL of dichloromethane, and succinic anhydride (1.5 g, 15 mmol) were added and stirred. To there was added triethylamine (2.0 g, 20 mmol) and stirred at room temperature for 12 hours. After completion of the reaction, 10% hydrochloric acid was added to the reaction solution cooled with ice water, and a liquid separation was performed. By performing solvent distillation from the organic layer, a compound represented by the following formula (7) was obtained.

[CF 26]

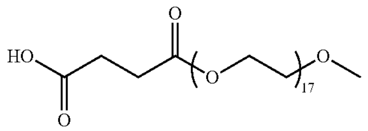

(7)

The number of repeating units of polyoxyethylene group and polyoxypropylene group can vary during the reaction process or the purification process. Therefore, in this Example, the number of repeating units after the reaction or purification in each step is presented.

Second Step 4.3 g (5.0 mmol) of the compound of the formula (7), 5.5 g (4.9 mmol) of the compound represented by the following formula (8), and 20 mL of dichloromethane were added.

[CF 27]

(8)

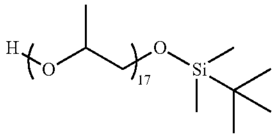

After stirring, 192 mg of WSC (water-soluble carbodiimide), 63 mg of DMAP (dimethylaminopyridine) were added and stirred for 12 hours.

After completion of the reaction, 10 mL of water was added, and a liquid separation was performed. Anhydrous magnesium sulfate was added to the organic layer, dried, and then magnesium sulfate was filtered off, and the solvent of the obtained filtrate was concentrated. After the concentration, 15 mL of tetrahydrofuran was added, stirred, and, while cooling with ice water, 7.5 mL of tetrabutylammonium fluoride (1 mM tetrahydrofuran solution) was added and stirred for 12 hours. After completion of the reaction, water was added and a liquid separation was performed. The solvent of the obtained organic layer was concentrated, and purified by silica gel column chromatography, whereby a compound represented by the following formula (9) was obtained.

[CF 28]

(9)

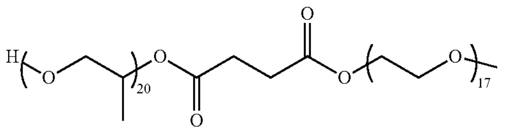

Third Step

The same operation as in the First step was performed, succinic anhydride was added to the above formula (9), whereby a compound represented by the following formula (10) was obtained.

[CF 29]

(10)

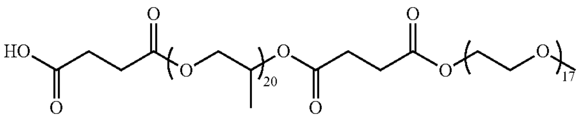

Fourth Step 100 mL of toluene was added to 4.62 g (10 mmol) of a compound represented by the following formula (11), 4.48 g (15 mmol) of a compound represented by the following formula (12) and 0.25 g (1.0 mmol) of p-toluenesulfonic acid pyridinium salt.

[CF 30]

(11)

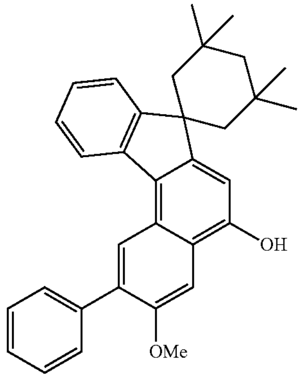

[CF 31]

(12)

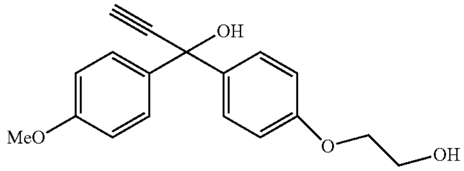

Stirring was performed at 75° C. for 2 hours. After cooling to room temperature, 100 mL of water was added and a liquid separation was performed. The solvent of the obtained organic layer is concentrated, and purified by silica gel column chromatography, whereby a chromene compound represented by the following formula (13) was obtained.

[CF 32]

(13)

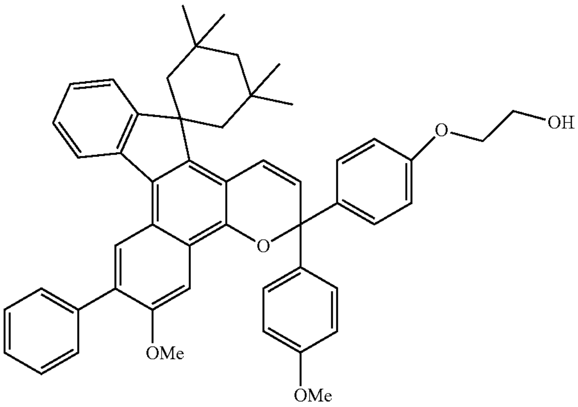

Fifth Step

To 20 mL of dichloromethane, 1.56 g (2.1 mmol) of the chromene compound represented by the above formula (13), 4.24 g (2.0 mmol) of the compound represented by the above formula (10) were added. After stirring, 380 mg of WSC and 120 mg of DMAP were added and stirred while shielding from light. After completion of the reaction, 10 mL of water was added, and a liquid separation was performed. The solvent of the obtained organic layer was concentrated, and purified by silica gel column chromatography, whereby a compound represented by the following formula (14) was obtained. The yield was 60%.

[CF 33]

(14)

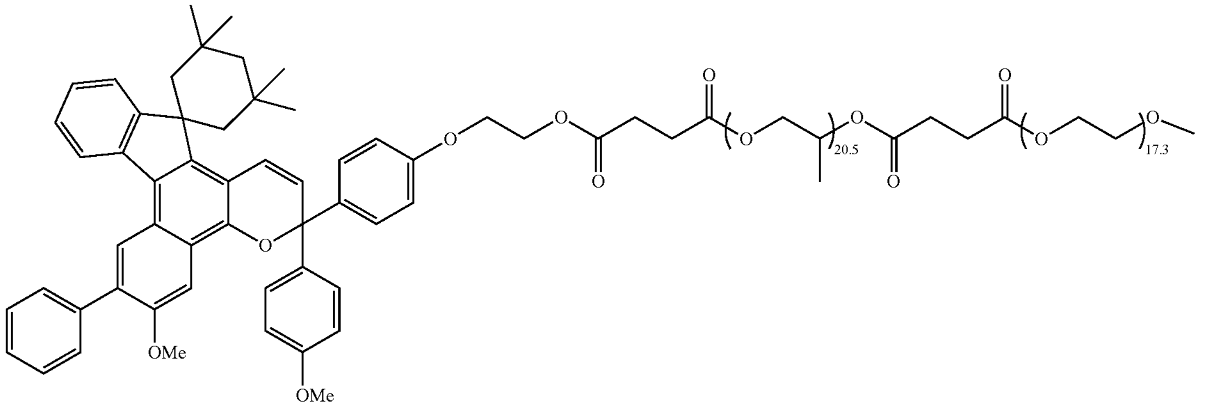

In a measurement of the proton nuclear magnetic resonance spectrum, with regard to a peak of a 21H based on an aromatic proton and an alkene proton observed around δ 5.6 to 9.0 ppm derived from a photochromic compound, a peak of about 40.5H based on a proton of a cyclohexane ring and a methyl group, a succinate moiety, or propylene oxy was shown around 1.0 to 3.0 ppm, and a peak of 143.7H based on a methoxy group, a propylene oxy group, or ethylene oxy was shown around δ 3.0 to 5.5 ppm. Therefore, the structure was confirmed to be consistent with the formula (14).

Example 2

First Step 35.0 g (50.0 mmol) of polypropylene glycol having a number average molecular weight of 700, 6.31 g (62.5 mmol) of triethylamine and 1 L of dichloromethane were added, which was ice-cooled. To this, 5.43 g (60.0 mmol) of acryloyl chloride was slowly added dropwise over a period of 1 hour. After completion of the reaction, 1 L of water was added, a liquid separation was performed, and the solvent of the obtained organic layer was concentrated and purified by silica gel column chromatography, whereby a polypropylene glycol monoacrylate having a number average molecular weight of 700 was obtained.

Second Step 14.1 g (18.7 mmol) of polypropylene glycol monoacrylate having a number average molecular weight of 700, 7.0 mg of dibutylhydroxytoluene (BHT), 2.0 g (20.0 mmol) of succinic anhydride and 500 mL of dichloromethane were added. While stirring under ice-cooling, 2.52 g (25 mmol) of triethylamine was slowly added. After stirring for 12 hours, 200 mL of water was added, a liquid separation was performed, and the solvent of the obtained organic layer was concentrated, whereby a compound represented by the following formula (15) was obtained.

[CF 34]

(15)

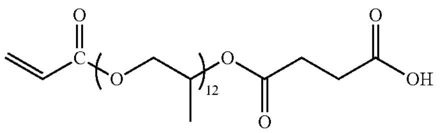

Third Step

To 50 mL of dichloromethane, 3.61 g (5.0 mmol) of chromene compound represented by the following formula (16), 4.19 g (4.9 mol) of the compound represented by the formula (15) were added.

[CF 35]

(16)

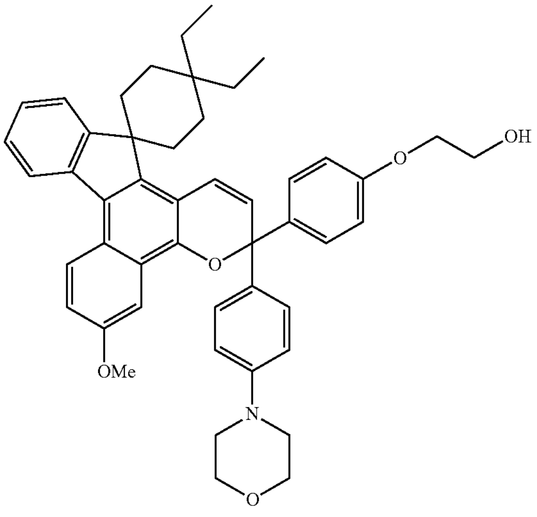

After stirring, 950 mg of WSC and 300 mg of DMAP were added and stirred while shielding from light. After completion of the reaction, 30 mL of water was added, a liquid separation was performed, and the solvent of the obtained organic layer was concentrated and purified by silica gel column chromatography, whereby a compound represented by the following formula (17) was obtained. The yield was 85%.

[CF 36]

(17)

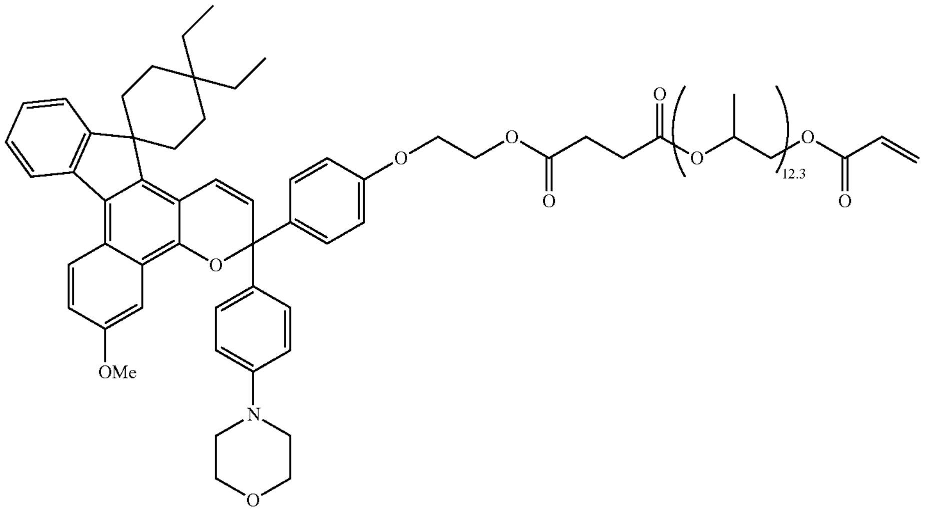

Fourth Step

In 30 mL of toluene, 6.76 g (4.2 mmol) of the compound represented by the above formula (17) was dissolved, to which 1.29 g (4.5 mmol) of 1-octadecanethiol and 5 g of neutral alumina were added, which was stirred at room temperature. After completion of the reaction, the neutral alumina was filtered off, and the solvent of the obtained organic layer was concentrated and purified by silica gel column chromatography, whereby a compound represented by the following formula (18) was obtained. The yield was 90%.

[CF 37]

(18)

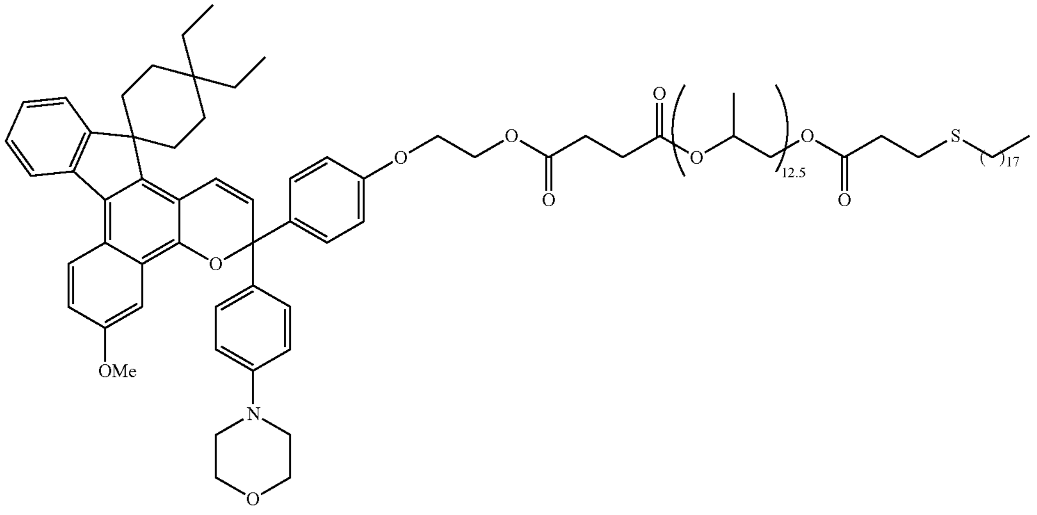

In a measurement of the proton nuclear magnetic resonance spectrum, with regard to a peak of a 17H based on an aromatic proton and an alkene proton observed around δ 5.6 to 9.0 ppm derived from a photochromic compound, a peak of about 96.5H based on a proton of a cyclohexane ring and an octadecyl group, a succinate moiety, or propylene oxy was shown around 1.0 to 3.0 ppm, and a peak of 56.5H based on a methoxy group, a propylene oxy group, an ethylene oxy group or a morpholino group was shown around δ 3.0 to 5.5 ppm. Therefore, the structure was confirmed to be consistent with the formula (18).

Example 3

First Step

In 500 ml pyridine, 40.0 g (100.0 mmol) of polyethylene glycol monoethyl ether having a number average molecular weight of 400 and 21.0 g (110.0 mmol) of toluenesulfonyl chloride were dissolved. Under ice-cooling, 2.2 g (20.0 mmol) of 1,4-diazabicyclo[2.2.2]octane was added while stirring, and stirred for 12 hours while heating to room temperature. After completion of the reaction, the reaction solution was added to ice water, and extraction was performed using dichloromethane. The obtained organic layer was dried with anhydrous magnesium sulfate, filtered off, and the solvent of the obtained organic layer was concentrated and purified by silica gel column chromatography, whereby a compound represented by the following formula (19) was obtained.

[CF 38]

(19)

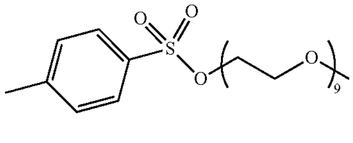

Second Step

While stirring 5.44 g (40.0 mmol) of 2-(methoxymethoxy)-1,3-propanediol, 100 mL of dimethylformamide (DMF) and 4.0 g (100.0 mmol) of sodium hydride (a product containing 40% mineral oil) under ice-cooling, 49.87 g (90.0 mol) of the compound of the above formula (19) was slowly added and reacted for 24 hours. After the reaction, 300 mL of water, 500 mL of THF and 500 mL of toluene were added, and a liquid separation was performed. The obtained organic layer was dried with anhydrous magnesium sulfate, filtered off, and the solvent of the obtained organic layer was concentrated and purified by silica gel column chromatography.

200 mL of methanol was added thereto, and 50 mL of hydrochloric acid was added and stirred at room temperature for 24 hours. After the reaction, neutralization was performed with sodium hydrogen carbonate, and then, methanol was concentrated, 500 mL of ethyl acetate and 200 mL of water were added, and a liquid separation was performed. The obtained organic layer was dried with anhydrous magnesium sulfate, filtered off, and the solvent of the obtained organic layer was concentrated and purified by silica gel column chromatography, whereby a compound represented by the following formula (20) was obtained.

[CF 39]

(20)

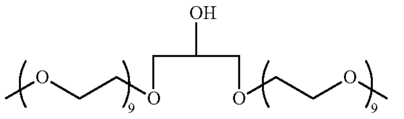

Third Step

The same reaction as that in the First step of Example 1 was carried out using the compound of the formula (20), whereby a compound represented in the following formula (21) was obtained.

[CF 40]

(21)

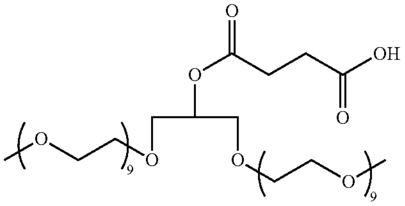

Fourth Step

The same reaction as in the Second step of Example 1 was carried out except that the compound of the formula (21) was used in place of the compound of the above formula (7), and a compound of the following formula (22) was used in place of the compound of the formula (8), whereby a compound represented by the following formula (23) was obtained.

[CF 41]

(22)

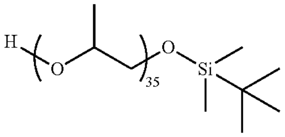

[CF 42]

(23)

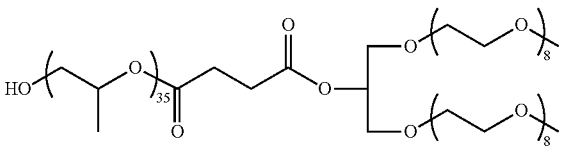

Fifth Step

The same reaction as in the First step of Example 1 was carried out using the compound of the formula (23), whereby a compound represented by the following formula (24) was obtained.

[CF 43]

(24)

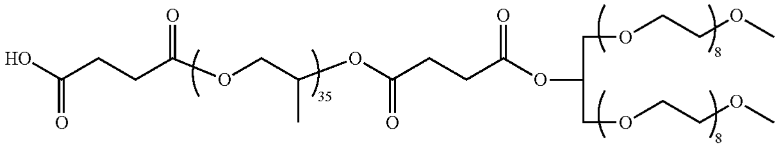

Sixth Step

The same step as in the Fifth step of Example 1 was carried out except that the compound represented by the following formula (25) was used in place of the compound of the formula (13), and the compound represented by the formula (24) was used by place of the compound of the formula (10), whereby a compound represented by the following formula (26) was obtained. The yield was 65%.

[CF 44]

(25)

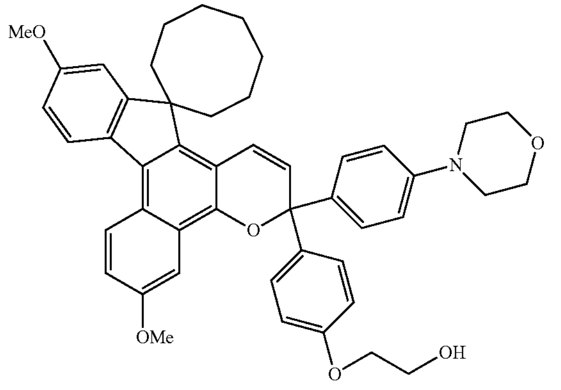

[CF 45]

(26)

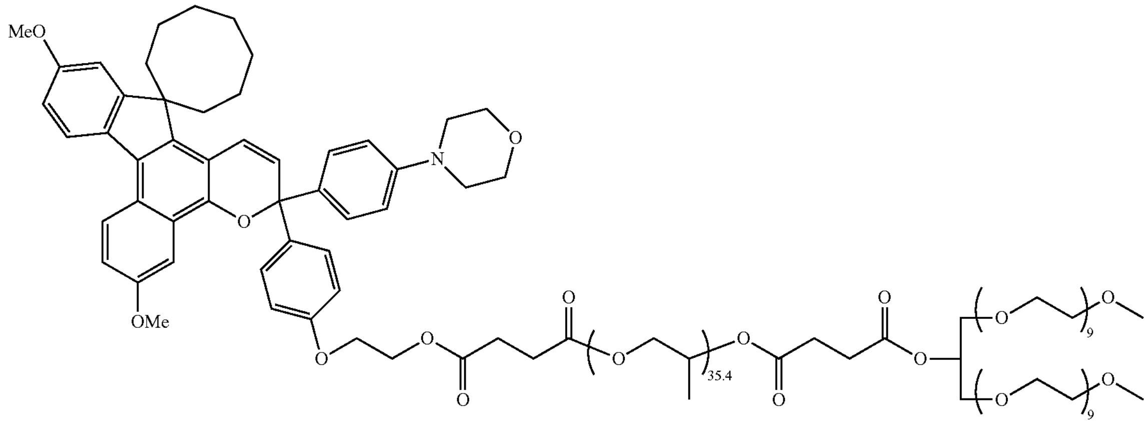

In a measurement of the proton nuclear magnetic resonance spectrum, with regard to a peak of a 16H based on an aromatic proton and an alkene proton observed around δ 5.6 to 9.0 ppm derived from a photochromic compound, a peak of about 136.2H based on a proton of a cycloctane ring, a succinate moiety, or propylene oxy was shown around 1.0 to 3.0 ppm, and a peak of 207.2H based on a methoxy group, a propylene oxy group, an ethylene oxy group, a morpholino group, or a glycerol group was shown around δ 3.0 to 5.5 ppm. Therefore, the structure was confirmed to be consistent with the formula (26).

Example 4

The same step as in the Second step of Example 1 was carried out except that 17.1 g (50.0 mmol) of eicosane diacid, 37.5 g (50.0 mmol) of polyethylene glycol monomethyl ether having a number average molecular weight of 750 were used, whereby a compound represented by the following formula (27) was synthesized.

[CF 46]

(27)

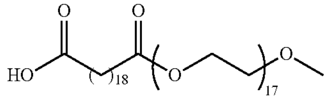

Second Step

The same reaction as in the Fourth step of Example 3 was carried out except that the compound of the formula (27) was used in place of the compound of the formula (21), whereby a compound represented by the following formula (28) was synthesized.

[CF 47]

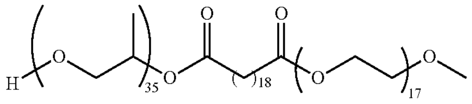

(28)

Third Step

The same reaction as in the First step of Example 1 was carried out using the product of the Second step, whereby a compound represented by the following formula (29) was synthesized.

[CF 48]

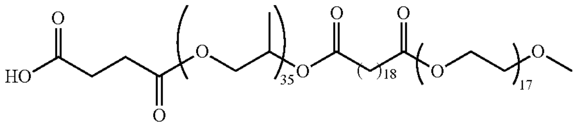

(29)

Fourth Step

The same reaction as in the Fourth step of Example 1 was carried out except that a compound represented by the following formula (30) was used in place of the compound of the formula (11), whereby a chromene compound represented by the following formula (31) was obtained.

[CF 49]

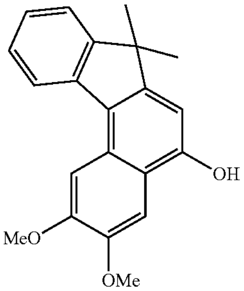

(30)

-continued

[CF 50]

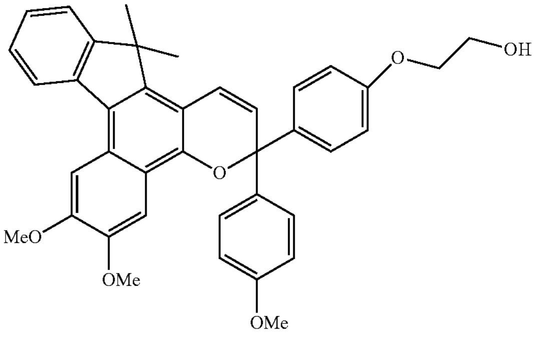

(31)

Fifth Step

The aforementioned formula (29) obtained in the Third step and the aforementioned formula (31) obtained in the Fourth step were reacted in the same manner as in the Fifth step of Example 1, whereby a compound represented by the following formula (32) was obtained. The yield was 69%.

[CF 51]

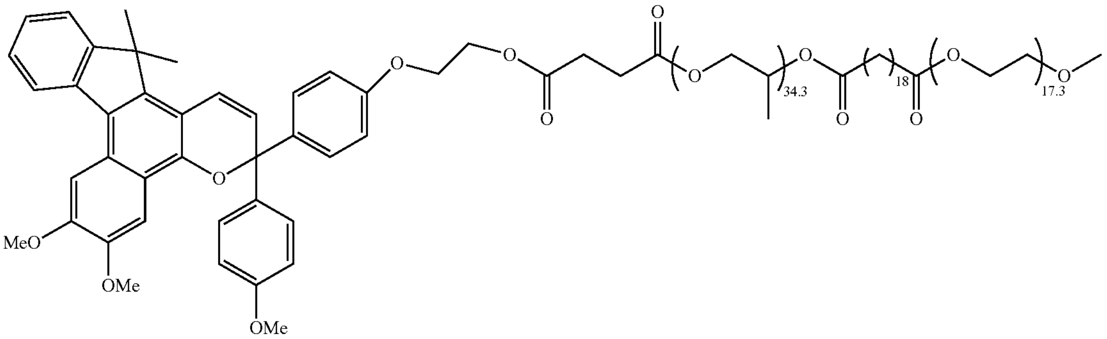

(32)

In a measurement of the proton nuclear magnetic resonance spectrum, with regard to a peak of a 16H based on an aromatic proton and an alkene proton observed around δ 5.6 to 9.0 ppm derived from a photochromic compound, a peak of about 148.9H based on a proton of a cycloctane ring, a succinate moiety, or propylene oxy was shown around 1.0 to 3.0 ppm, and a peak of 188.1H based on a methoxy group, a propylene oxy group, or an ethylene oxy group was shown around δ3.0 to 5.5 ppm. Therefore, the structure was confirmed to be consistent with the formula (32).

Example 5

First Step

The step was carried out as in Example 1 except that lignoceric acid was used in place of the compound of the formula (7), whereby a compound represented by the following formula (33) was obtained.

[CF 52]

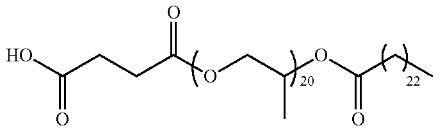

(33)

Second Step

The same reaction as in the Fifth step of Example 1 was carried out except that the compound of the formula (33) was used in place of the compound of the formula (10) and a compound shown by the following formula (34) was used in place of the compound of the formula (13), whereby a compound as represented by the following formula (35) was obtained. The yield was 72%.

In a measurement of the proton nuclear magnetic resonance spectrum, with regard to a peak of a 19H based on an aromatic proton and an alkene proton observed around δ 5.6 to 9.0 ppm derived from a photochromic compound, a peak of about 130.5H based on a proton of a cyclohexane ring, a succinate moiety, or propylene oxy was shown around 1.0 to 3.0 ppm, and a peak of 76.5H based on a morpholino group, a methoxy group, a propylene oxy group, or an ethylene oxy group was shown around δ 3.0 to 5.5 ppm. Therefore, the structure was confirmed to be consistent with the formula (35).

(Production and Evaluation of Cured Body (Thiourethane-Based Molded Body))

The respective components were mixed in accordance with the following formation to prepare the photochromic curable composition. Each blending amount is shown below.

[CF 53]

(34)

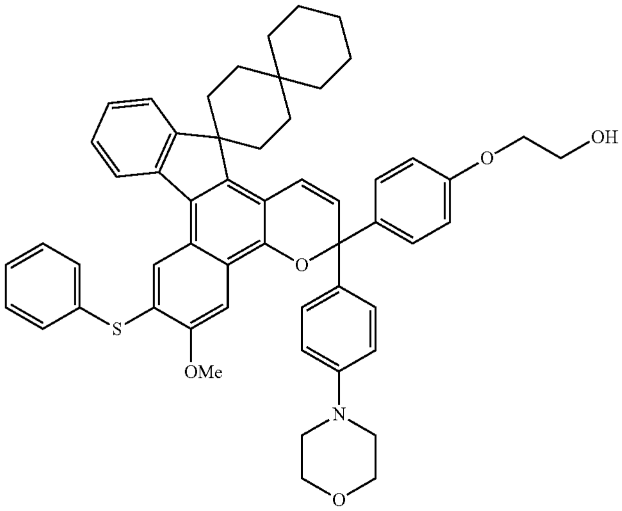

[CF 54]

(35)

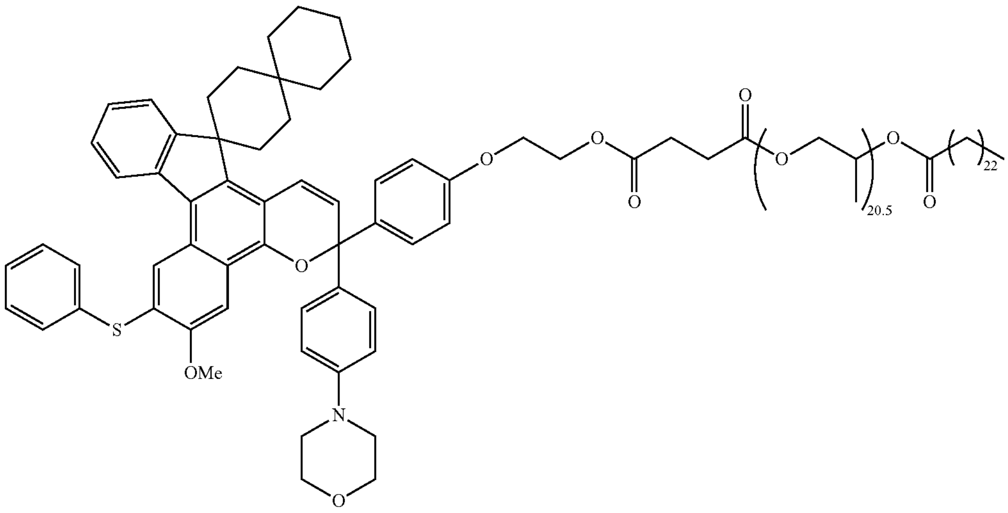

Table 1 shows the results for the photochromic properties of the cured bodies using the photochromic compounds of Examples 1 to 5.

(Blend Composition of Polymerizable Compound)

m-xylene diisocyanate: 43.1 parts by mass Pentaerythritol tetrakis(3-mercaptopropionate): 49.7 parts by mass 1-decanethiol: 2.7 parts by mass RX-1 prepared by the method described in International Publication WO2016/143910: 4.5 parts by mass Dimethyldichlorotin: 0.05 parts by mass JP-506H (manufactured by JOHOKU CHEMICAL CO., LTD.): 0.1 parts by mass Ethylenebis(oxyethylene)bis[3-(5-tert-butyl-4-hydroxy-m-tolyl)propionate]: 0.1 parts by mass Examples 6 to 10, Comparative Examples 1 to 3

The photochromic curable composition was prepared by adding a photochromic compound so that the photochromic moiety would be 0.53 μmol relative to 100 g of the polymerizable compound in the blend composition of the polymerizable compound described above. The photochromic curable composition thus obtained was used for polymerization by a kneading method to obtain a photochromic cured body. The polymerization method is as follows.

(Polymerization Method)

After a sufficient defoaming, the photochromic curable composition was cast into a mold having a thickness of 2 mm and composed of a gasket of a glass mold and an ethylene-vinyl acetate copolymer. The composition was then cured over a period of 24 hours with a gradual increase in temperature from 25° C. to 70° C. After completion of the polymerization, the photochromic cured body was detached from the mold glass, and then annealed at 100° C. for 1 hour.

(Method for Evaluation of Cured Body)

The obtained cured body was used as a sample. This was irradiated using a xenon lamp L-2480 (300 W) SHL-100 manufactured by Hamamatsu Photonics K.K. for 300 seconds at a beam intensity of 365 nm=2.4 $mW/cm^2$, 245 nm=24 $\mu W/cm^2$ at 20±1° C. on the surface of the cured body via an aeromas filter (manufactured by Corning Incorporated) to develop color, whereby the photochromic properties of the cured body were measured.

The photochromic properties, white turbidity of the cured body and the like were evaluated by the following method.

(1) Photochromic Properties

Maximum Absorption Wavelength (λmax)

This is the maximum absorption wavelength after color development determined by a spectrophotometer (MCPD1000: instantaneous multi-channel photodetector) manufactured by Otsuka Electronics Co., Ltd. The maximum absorption wavelength relates to the color tone at the time of color development.

Chromogenic Density {ε(300)-ε(0)}

This is the difference between the absorbance {ε(300)} after light irradiation for 300 seconds and the absorbance ε(0) before light irradiation at the maximum absorption wavelength. It is considered that when the value is higher, the photochromic properties are better.

Fading Rate [t½(]ec.)]

This is the time required for the absorbance at the maximum absorption wavelength of the sample to decrease to ½ of {ε(300)-ε(0)} when the irradiation of light is stopped after light irradiation for 300 seconds. It is considered that when the time is shorter, the photochromic properties are better.

(2) White Turbidity

The molded cured body was visually evaluated for white turbidity.

1: No turbidity can be visually observed, and no turbidity can be observed even when light is transmitted therethrough.

2: No turbidity can be visually observed, while a slight turbidity can be visually observed when light is transmitted therethrough.

3: No turbidity can be visually observed, while a turbidity denser than that of 2. can be visually observed when light is transmitted therethrough.

4: Slight turbidity can be visually confirmed.

5: White turbidity can be clearly confirmed visually.

Comparative Example Compound

Photochromic compounds having the following structures were used in Comparative Examples 1 to 4.

Comparative Examples 1 and 4

[CF 55]

(36)

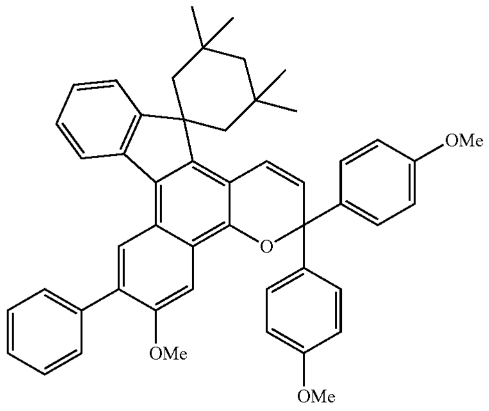

Comparative Example 2

[CF 56]

(37)

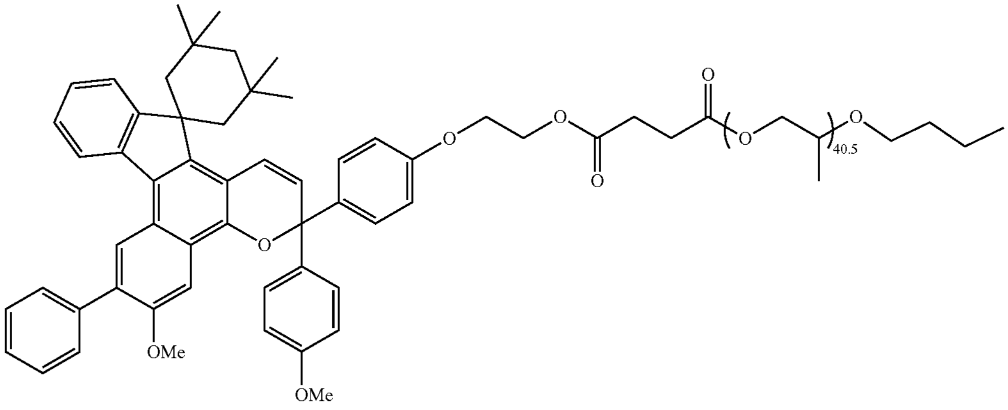

Comparative Example 3

[CF 57]

(38)

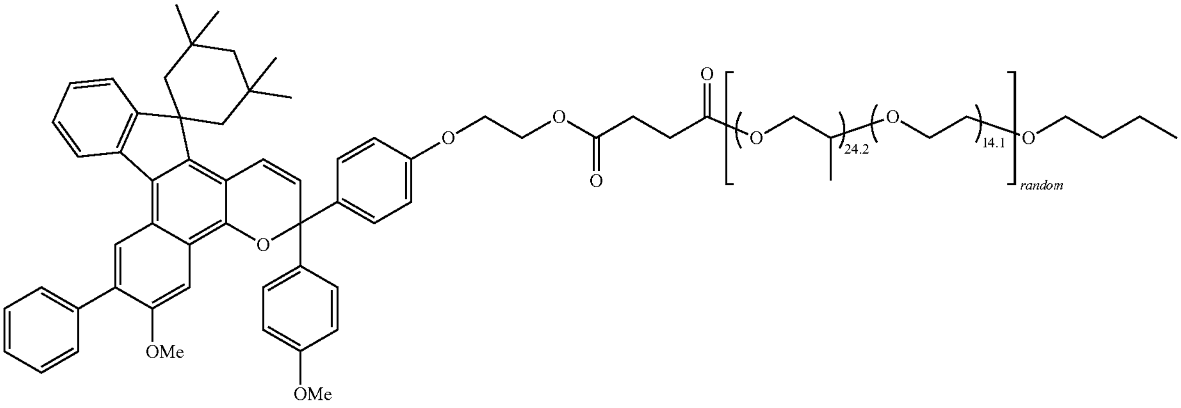

TABLE 1

| | Pigment in use | Cured body | Maximum absorption wavelength (nm) | 23° C. chromogenic density (—) | 23° C. color fading rate (sec.) | Turbidity |
|---|---|---|---|---|---|---|
| Example 6 | Example 1 | Thiourethane- | 451 | 0.44 | 95 | 1 |
| | Formula (14) | based | 565 | 0.44 | 95 | |
| Example 7 | Example 2 | Thiourethane- | 466 | 0.45 | 122 | 1 |
| | Formula (18) | based | 581 | 0.90 | 124 | |
| Example 8 | Example 3 | Thiourethane- | 459 | 0.71 | 111 | 1 |
| | Formula (26) | based | 592 | 1.42 | 114 | |
| Example 9 | Example 4 | Thiourethane- | 455 | 1.16 | 125 | 1 |
| | Formula (32) | based | 574 | 0.82 | 126 | |
| Example 10 | Example 5 | Thiourethane- | 481 | 0.76 | 110 | 2 |
| | Formula (35) | based | 591 | 0.88 | 112 | |
| Comparative | Comparative | Thiourethane- | 450 | 0.18 | 140 | 1 |
| Example 1 | Example 1 | based | 568 | 0.18 | 140 | |
| | Formula (36) | | | | | |

TABLE 1-continued

| | Pigment in use | Cured body | Maximum absorption wavelength (nm) | 23° C. chromogenic density (—) | 23° C. color fading rate (sec.) | Turbidity |
|---|---|---|---|---|---|---|
| Comparative Example 2 | Comparative Example 2 Formula (37) | Thiourethane-based | Not measurable | | | 5 |
| Comparative Example 3 | Comparative Example 3 Formula (38) | Thiourethane-based | 451<br>567 | 0.40<br>0.39 | 100<br>99 | 3 |

In Table 1, the positions (wavelengths) of the two peaks appearing in the spectroscopic spectrum are described in the column denoted as "maximum absorption wavelength". One of the two peaks, which appears at a shorter wavelength, is defined as a first peak, and the wavelength is described in the upper row of each cell. Another peak appearing at a longer wavelength is defined as a second peak, and the wavelength is described in the lower row of each cell. In the column denoted as "23° C. chromogenic density", the 23° C. chromogenic density of the first peak is described in the upper row of the cell, and the 23° C. chromogenic density of the second peak is described in the lower row of each cell. In the column denoted as "23° C. fading rate", the 23° C. fading rate of the first peak is described in the upper row of each cell, and the 23° C. fading rate of the second peak is described in the lower row of each cell. The same applies to Tables 2 to 4.

As is apparent from Table 1, the photochromic compounds of the present invention exhibit excellent photochromic properties compared with the photochromic compound of Comparative Example 1 having no oligomeric chain group.

It is also demonstrated that aggregation of the photochromic compound is prevented or reduced as compared with the photochromic compound of Comparative Example 2 where only the polyoxypropylene chain group is used.

The photochromic compound of Comparative Example 3 having an oligomeric chain group of a random polymer type with polyethylene glycol of Comparative Example 3 has an improved compatibility (dispersibility in a solid matrix) as compared with a photochromic compound of Comparative Example 2 in which only a polypropylene glycol chain is used, and white turbidity is prevented or reduced. In the case of a random type polymer, however, since formation of a micro-phase separation structure is insufficient, dispersibility is inferior to that of the photochromic compound of Example 1 having a block oligomeric chain group with polyethylene glycol.

As is apparent from these results, the photochromic compounds of the present invention have excellent photochromic properties even in a solid matrix, and the compounds are excellent in dispersibility.

Example 11

The same reaction as in Example 1 was carried out except that polyethylene glycol monocetyl ether having a number average molecular weight of 770 was used in place of polyethylene glycol monomethyl ether having a number average molecular weight of 750, whereby a compound represented by the following formula (39) was obtained. The yield was 65%.

[CF 58]

(39)

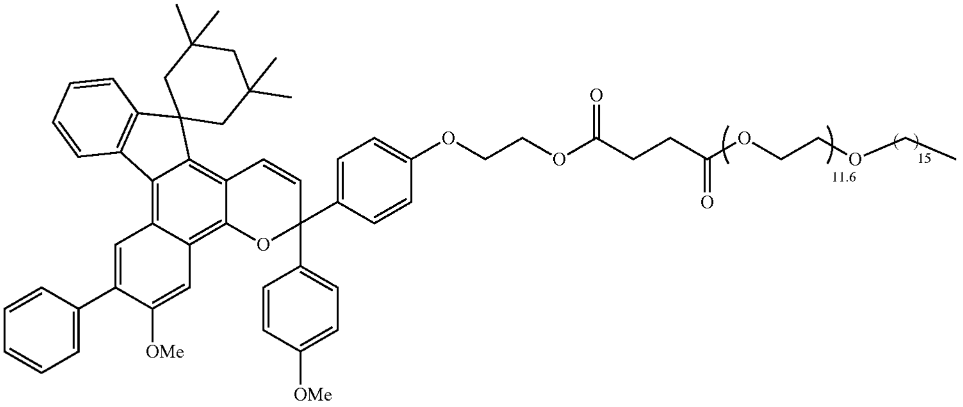

In a measurement of the proton nuclear magnetic resonance spectrum, with regard to a peak of a 21H based on an aromatic proton and an alkene proton observed around δ 5.6 to 9.0 ppm derived from a photochromic compound, a peak of 52H based on a proton of a cyclohexane ring and a methyl group, a succinate moiety, or a hexadecyl group was shown around 1.0 to 3.0 ppm, and a peak of about 58.4H based on a methoxy group, a propylene oxy group, or ethylene oxy was shown around δ 3.0 to 5.5 ppm. Therefore, the structure was confirmed to be consistent with the formula (39).

Example 12

First Step 115.4 g (100.0 mmol) of a compound represented by the following formula (40), 1000 mL of DMF, 17.0 g (250.0 mmol) of imidazole were added and stirred under ice-cooling. 14.9 g (99.0 mmol) of tertiary butyldimethylchlorosilane dissolved in 150 mL of DMF was slowly added thereto dropwise. After stirring for 12 hours, 1000 mL of water and 1500 mL of toluene were added and a liquid separation was performed. The solvent of the obtained organic layer was concentrated and purified by silica gel column chromatography, whereby a compound represented by the following formula (41) was obtained.

[CF 59]

(40)

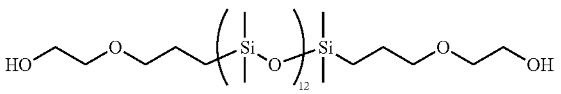

[CF 60]

(41)

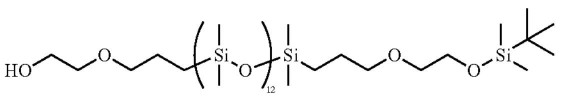

Second Step

The same operation as in Example 1 was carried out using the formula (41), whereby a compound represented by the following formula (42) was obtained.

[CF 61]

(42)

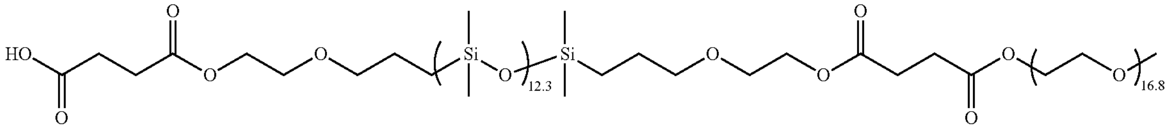

Third Step

The same step as in the Fifth step of Example 1 was carried out except that the compound represented by the formula (42) was used in place of the formula (10) and a compound represented by the following formula (43) was used in place of the compound of the formula (13), whereby a compound represented by the following formula (44) was obtained. The yield was 65%.

[CF 62]

(43)

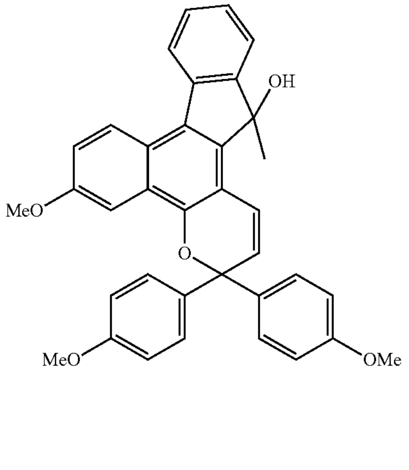

-continued

[CF 63]

(44)

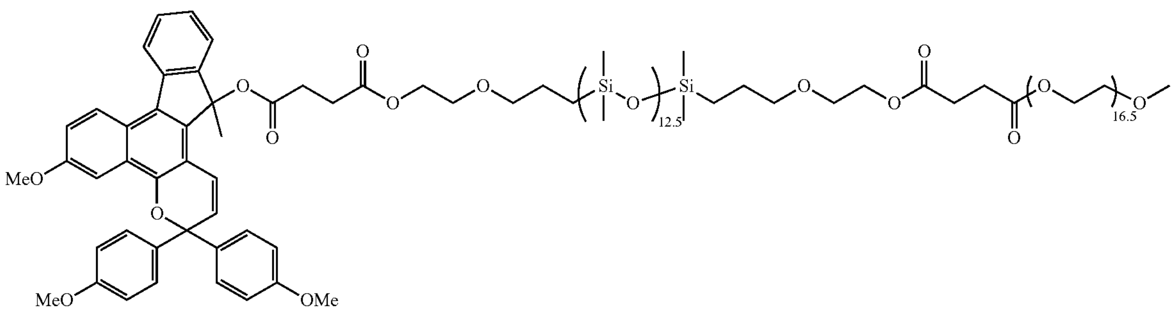

In a measurement of the proton nuclear magnetic resonance spectrum, with regard to a peak of a 17H based on an aromatic proton and an alkene proton observed around δ 5.6 to 9.0 ppm derived from a photochromic compound, a peak of about 100H based on a proton of a dimethylsilyl group, a succinate moiety, or a methyl group was shown around −1.0 to 3.0 ppm, and a peak of about 90H based on a methoxy group, or ethylene oxy was shown around δ 3.0 to 5.5 ppm. Therefore, the structure was confirmed to be consistent with the formula (44).

(Production and Evaluation of Cured Body (Acrylic Molded Body))

The respective components were mixed in accordance with the following formulation to prepare a photochromic curable composition. Each blending amount is shown below. The results of the photochromic properties of the cured bodies using the photochromic compounds of Examples described in Table 2 are shown in Table 2.

(Blend Composition of Polymerizable Compound)

Propylene glycol diacrylate: 45 parts by mass

Trimethylolpropane triacrylate: 11 parts by mass

Polyethylene glycol diacrylate: 17 parts by mass

UA-306T manufactured by KYOEISHA CHEMICAL Co., Ltd.: 27 parts by mass

Ethylenebis(oxyethylene)bis[3-(5-tert-butyl-4-hydroxy-m-tolyl)propionate]: 0.1 parts by mass Bis(1,2,2,6,6-pentamethyl-4-piperidyl)sebacate: 0.1 parts by mass Ditertiarybutyl peroxide: 1.75 parts by mass

Examples 13 to 16, Comparative Example 4

The photochromic curable composition was prepared by adding a photochromic compound so that the photochromic moiety would be 0.53 μmol relative to 100 g of the polymerizable compound in the blend composition of the polymerizable compound described above. The photochromic curable composition thus obtained was used for polymerization by a kneading method to obtain a photochromic cured body. The polymerization method is as follows.

(Polymerization Method)

After a sufficient defoaming, the photochromic curable composition was cast into a mold having a thickness of 2 mm and composed of a gasket of a glass mold and an ethylene-vinyl acetate copolymer. The composition was then cured over a period of 24 hours with a gradual increase in temperature from 25° C. to 90° C. After completion of the polymerization, the cured body was detached from the mold glass, and then annealed at 100° C. for 2 hours. Table 2 shows the results.

TABLE 2

| | Pigment in use | Cured body | Maximum absorption wavelength (nm) | 23° C. chromogenic density (—) | 23° C. color fading rate (sec.) | Turbidity |
|---|---|---|---|---|---|---|
| Example 13 | Example 1 Formula (14) | Acrylic | 452<br>566 | 0.68<br>0.68 | 38<br>38 | 1 |
| Example 14 | Example 3 Formula (26) | Acrylic | 460<br>596 | 0.75<br>1.52 | 140<br>140 | 1 |
| Example 15 | Example 11 Formula (39) | Acrylic | 451<br>569 | 0.65<br>0.65 | 33<br>33 | 1 |
| Example 16 | Example 12 Formula (44) | Acrylic | 448<br>580 | 0.57<br>0.74 | 60<br>60 | 1 |
| Comparative Example 4 | Comparative Example 1 Formula (36) | Acrylic | 452<br>571 | 0.62<br>0.62 | 56<br>56 | 1 |

It can be seen that the photochromic compound of the present invention exhibits excellent effects even in an acrylic base material.

Example 17

First Step

The same step as in the First step of Example 1 was carried out except that polypropylene glycol monobutyl ether having a number average molecular weight of 1500 was used in place of polyethylene glycol monomethyl ether having a number average molecular weight of 750, whereby a compound represented by the following formula (45) was obtained.

[CF 64]

(45)

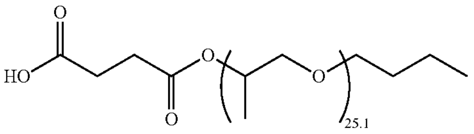

Second Step

The same step as in the First step of Example 12 was carried out except that polytetramethylene glycol having a number average molecular weight of 2000 was used in place of the compound of the above formula (40), whereby a compound represented by the following formula (46) was obtained.

[CF 65]

(46)

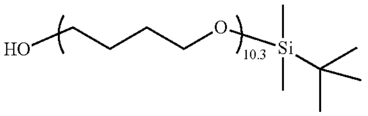

Third Step

The same reaction as in the Second step of Example 1 was carried out except that the compound of the formula (45) was used in place of the compound of the formula (7), and the compound of the formula (46) was used in place of the compound of the formula (8), whereby a compound represented by the following formula (47) was obtained.

[CF 66]

(47)

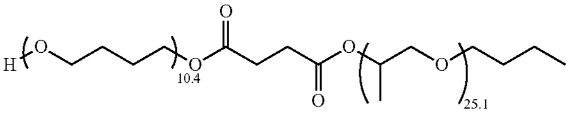

Fourth Step

The same operation as in the Third step of Example 1 was carried out, and succinic anhydride was added to the above formula (47), whereby a compound represented by the following formula (48) was obtained.

[CF 67]

(48)

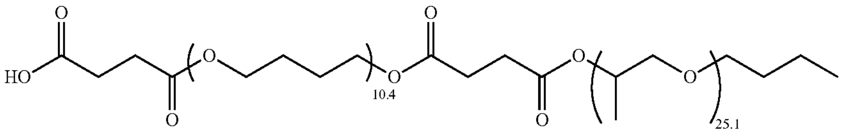

Fifth Step

The same step as in the Third step of Example 2 was carried out except that the compound of the formula (48) was used in place of the compound of the formula (15), whereby a compound represented by the following formula (49) was obtained. The yield was 67%.

[CF 68]

(49)

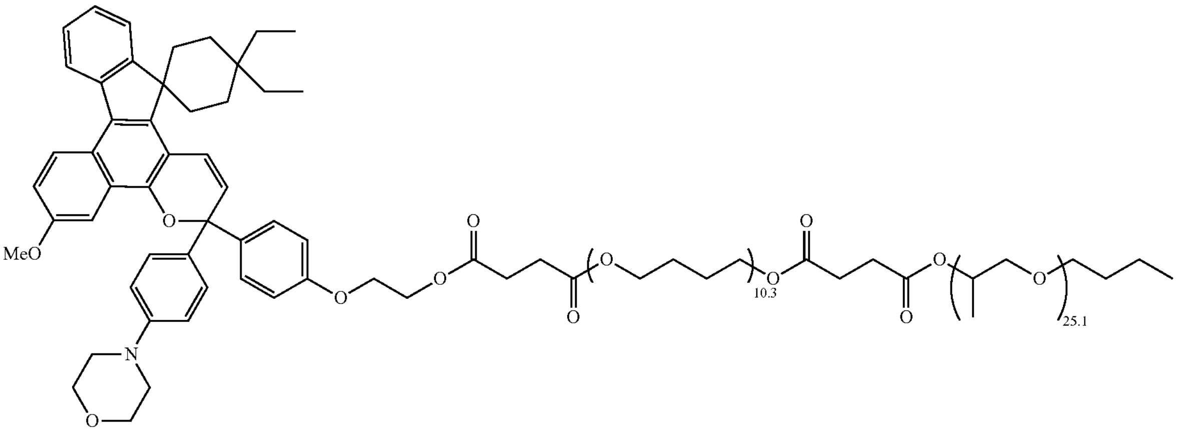

In a measurement of the proton nuclear magnetic resonance spectrum, with regard to a peak of a 17H based on an aromatic proton and an alkene proton observed around δ 5.6 to 9.0 ppm derived from a photochromic compound, a peak of about 149.5H based on a proton of a cyclohexane ring and a butyl group, a succinate moiety, a propylene oxy group, or a tetramethylene glycol group was shown around 1.0 to 3.0 ppm, and a peak of 133.5H based on a methoxy group, a propylene oxy group, an ethylene oxy group, a morpholino group, or a tetramethylene glycol group was shown around δ 3.0 to 5.5 ppm. Therefore, the structure was confirmed to be consistent with the formula (49).

Example 18

First Step

The same reaction as in the Third step of Example 17 was carried out except that a compound of the following formula (50) was used in place of the compound of the formula (45), whereby a compound represented by the following formula (51) was obtained.

[CF 69]

(50)

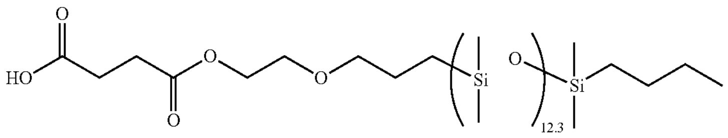

[CF 70]

(51)

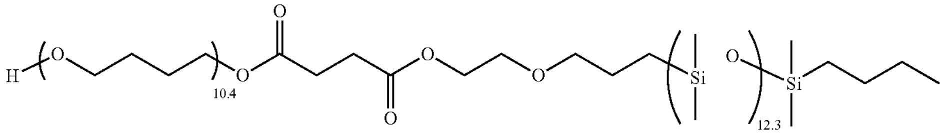

Second Step

The same operation as in the Fourth step of Example 17 was carried out, and succinic anhydride was added to the above formula (51), whereby a compound represented by the following formula (52) was obtained.

[CF 71]

(52)

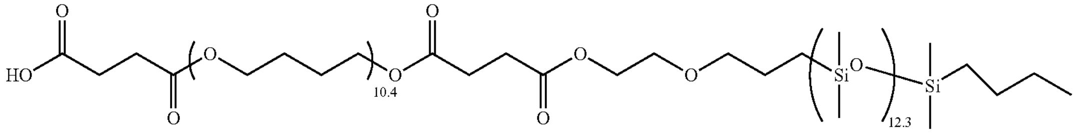

Third Step

The same step as in the Fifth step of Example 1 was carried out except that a chromene compound represented by the following formula (53) was used in place of the chromene compound represented by the above formula (13), and the compound represented by the formula (52) was used in place of the compound of the formula (10), whereby a compound represented by the following formula (54) was obtained. The yield was 56%.

[CF 72]

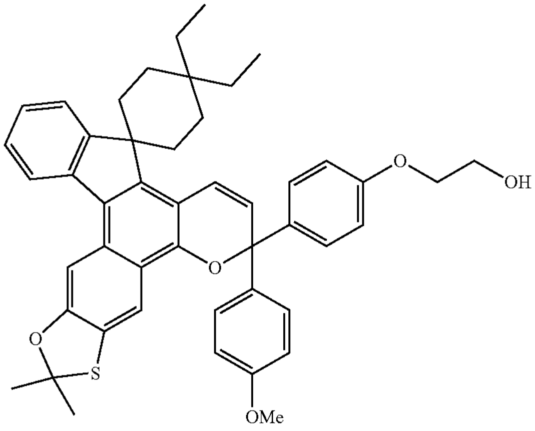

(53)

[CF 73]

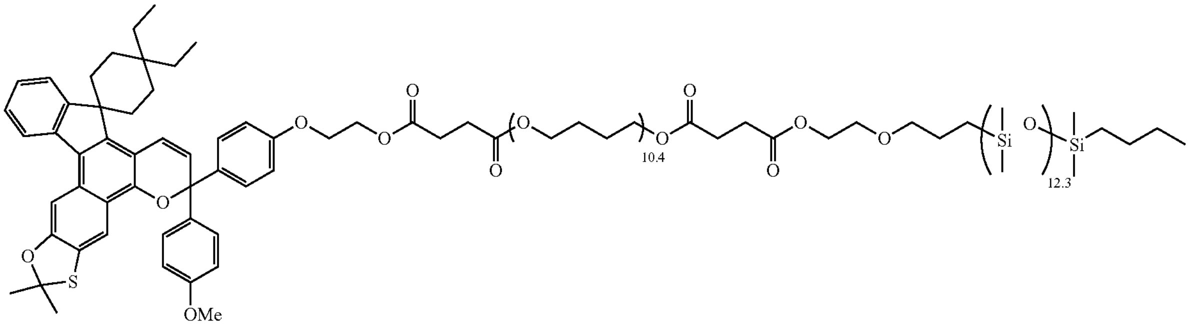

(54)

In a measurement of the proton nuclear magnetic resonance spectrum, with regard to a peak of a 16H based on an aromatic proton and an alkene proton observed around δ 5.6 to 9.0 ppm derived from a photochromic compound, a peak of about 166.4H based on a proton of a cyclohexane ring and a butyl group, a succinate moiety, a dimethylsilyl group, or a tetramethylene glycol group was shown around 0.0 to 3.0 ppm, and a peak of 55H based on a methoxy group, a propylene oxy group, an ethylene oxy group, or a tetramethylene glycol group was shown around δ 3.0 to 5.5 ppm. Therefore, the structure was confirmed to be consistent with the formula (54).

Example 19

The same step as in the Third step of Example 17 was carried out except that the compound of the formula (41) was used in place of the compound of the formula (46), whereby a compound represented by the following formula (55) was obtained.

[CF 74]

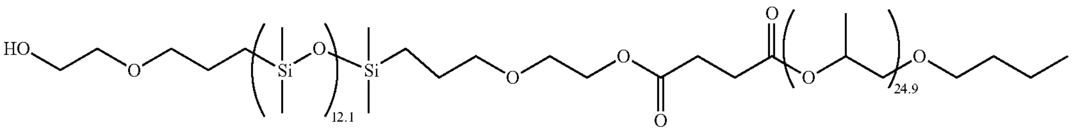

(55)

Second Step

The same operation as in the Fourth step of Example 17 was carried out, and succinic anhydride was added to the above formula (55), whereby a compound represented by the following formula (56) was obtained.

[CF 75]

(56)

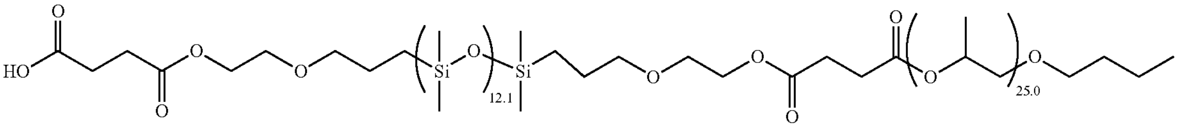

Third Step

The same step as in the Fifth step of Example 17 was carried out except that the compound of the formula (56) was used in place of the compound of the above formula (48), whereby a compound represented by the following formula (57) was obtained. The yield was 54%.

[CF 76]

(57)

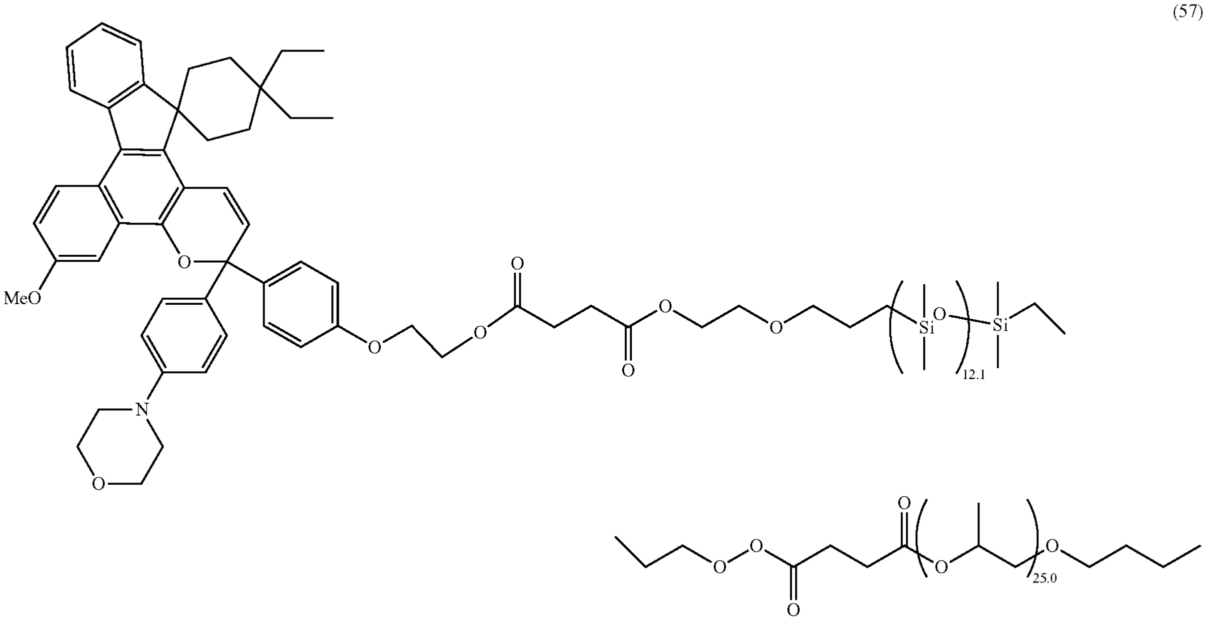

In a measurement of the proton nuclear magnetic resonance spectrum, with regard to a peak of a 17H based on an aromatic proton and an alkene proton observed around δ 5.6 to 9.0 ppm derived from a photochromic compound, a peak of about 194.9H based on a proton of a cyclohexane ring and a butyl group, a succinate moiety, a propylene oxy group, or a dimethyl siloxane group was shown around 0.0 to 3.0 ppm, and a peak of about 104.3H based on a methoxy group, a propylene oxy group, an ethylene oxy group, or a morpholino group was shown around δ 3.0 to 5.5 ppm. Therefore, the structure was confirmed to be consistent with the formula (57).

Example 20

First Step

The same reaction as in the Third step of Example 17 was carried out except that the compound of the formula (7) was used in place of the compound of the formula (45), whereby a compound represented by the following formula (58) was obtained.

[CF 77]

(58)

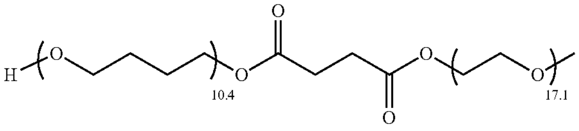

Second Step

The same operation as in the Fourth step of Example 17 was carried out, and succinic anhydride was added to the above formula (58), whereby a compound represented by the following formula (59) was obtained.

[CF 78]

(59)

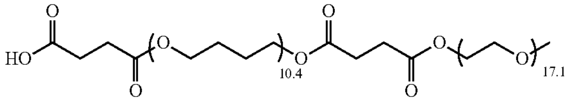

Third Step

The same reaction as in the Fifth step of Example 1 was carried out except that the compound of the formula (59) was used in place of the compound of the formula (10), whereby a compound represented by the following formula (60) was obtained. The yield was 57%.

[CF 79]

(60)

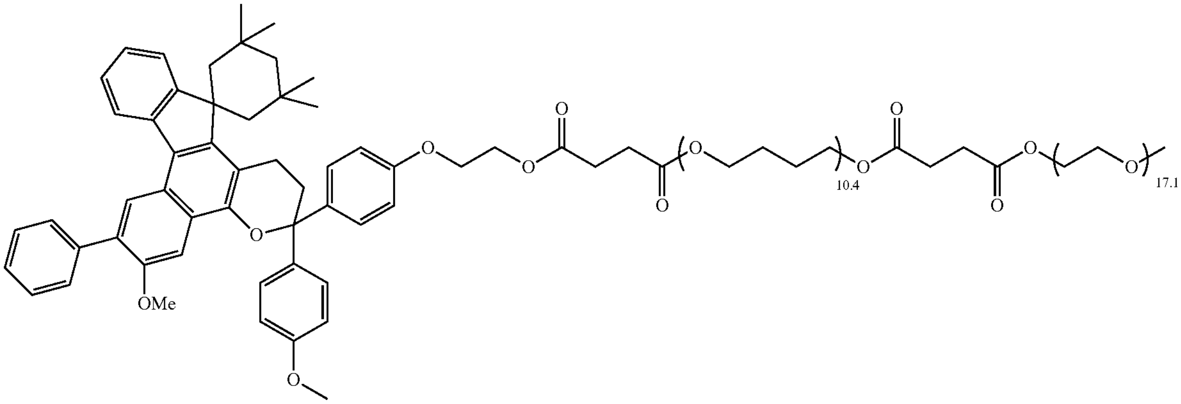

In a measurement of the proton nuclear magnetic resonance spectrum, with regard to a peak of a 21H based on an aromatic proton and an alkene proton observed around δ 5.6 to 9.0 ppm derived from a photochromic compound, a peak of about 67.6H based on a proton of a cyclohexane ring and a methyl group, a succinate moiety, or tetramethylene glycol was shown around 1.0 to 3.0 ppm, and a peak of about 123H based on a methoxy group, a tetramethylene glycol group, or ethylene oxy was shown around δ 3.0 to 5.5 ppm. Therefore, the structure was confirmed to be consistent with the formula (60).

Example 21

First Step

The same step as in the First step of Example 1 was carried out except that polypropylene glycol monobutyl ether having a number average molecular weight of 2500 was used in place of polyethylene glycol monomethyl ether having a number average molecular weight of 750, whereby a compound represented by the following formula (61) was obtained.

[CF 80]

(61)

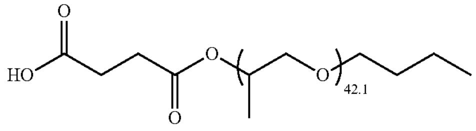

Second Step

The same step as in the First step of Example 12 was carried out except that polyethylene glycol having a number average molecular weight of 1000 was used in place of the compound of the above formula (40), whereby a compound represented by the following formula (62) was obtained.

[CF 81]

(62)

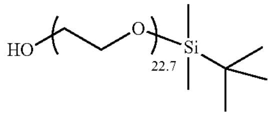

Third Step

The same reaction as in the Second step of Example 1 was carried out except that the compound of the formula (61) was used in place of the compound of the formula (7), and the compound of the formula (62) was used in place of the compound of the formula (8), whereby a compound represented by the following formula (63) was obtained.

[CF 82]

(63)

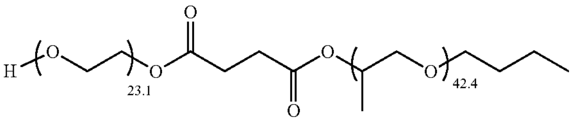

Fourth Step

The same operation as in the Fourth step of Example 17 was carried out, and succinic anhydride was added to the above formula (63), whereby a compound represented by the following formula (64) was obtained.

[CF 83]

(64)

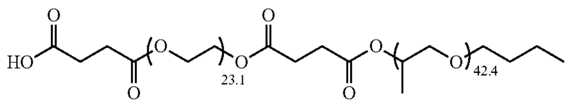

Fifth Step

The same reaction as in the Fifth step of Example 1 was carried out except that the compound of the formula (64) was used in place of the compound of the formula (10), whereby a compound represented by the following formula (65) was obtained. The yield was 63%.

[CF 84]

(65)

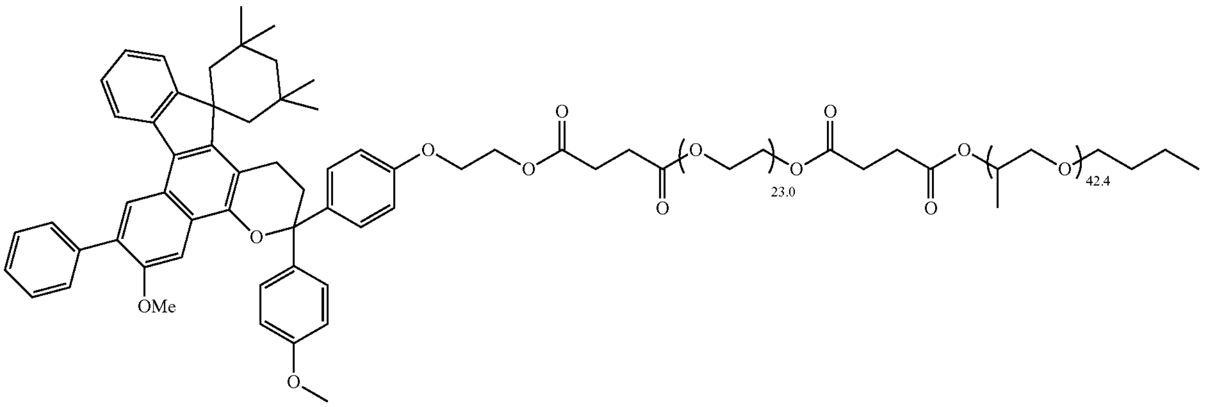

In a measurement of the proton nuclear magnetic resonance spectrum, with regard to a peak of a 21H based on an aromatic proton and an alkene proton observed around δ 5.6 to 9.0 ppm derived from a photochromic compound, a peak of about 160.2H based on a proton of a cyclohexane ring and a methyl group, a succinate moiety, or a butyl group was shown around 1.0 to 3.0 ppm, and a peak of about 231.2H based on a methoxy group, an ethylene glycol moiety, a propylene glycol moiety, an ethylene oxy group, or a butoxy group was shown around δ 3.0 to 5.5 ppm. Therefore, the structure was confirmed to be consistent with the formula (65).

Examples 22 to 25

Evaluation of the photochromic cured bodies was performed in the same manner as in Example 6. The results are shown in Table 3.

TABLE 3

| | Pigment in use | Cured body | Maximum absorption wavelength (nm) | 23° C. chromogenic density (—) | 23° C. color fading rate (sec.) | Turbidity |
|---|---|---|---|---|---|---|
| Example 22 | Example 17 | Thiourethane- | 459 | 0.49 | 83 | 1 |
| | Formula (49) | based | 574 | 0.97 | 84 | |
| Example 23 | Example 18 | Thiourethane- | 464 | 0.61 | 139 | 1 |
| | Formula (54) | based | 568 | 0.44 | 140 | |
| Example 24 | Example 19 | Thiourethane- | 462 | 0.51 | 71 | 3 |
| | Formula (57) | based | 578 | 0.94 | 70 | |
| Example 25 | Example 21 | Thiourethane- | 447 | 0.64 | 40 | 1 |
| | Formula (65) | based | 562 | 0.64 | 40 | |

Examples 26 to 28, Comparative Examples 5 to 7

(Production and Evaluation of Photochromic Laminate)

The respective components were mixed in accordance with the following formulation to prepare photochromic curable compositions. Each blending amount is shown below.

(Blend Composition of Polymerizable Compound)

Polyethylene glycol dimethacrylate (average molecular weight: 736) 32 parts by mass Polyethylene glycol dimethacrylate (average molecular weight: 536) 18 parts by mass Trimethylolpropane trimethacrylate 37 parts by mass γ-methacryloyloxypropyltrimethoxysilane 2 parts by mass was spin-coated at a rotational speed of 100 rpm for 25 seconds followed by a 1000 rpm of 10 to 20 seconds so that the film thickness of the photochromic coating layer would be 40 μm.

The lens with the coating agent applied on the surface in this manner was irradiated with light for 90 seconds using a metal halide lamp having a power of 200 mW/cm$^2$ in a nitrogen gas atmosphere, thereby curing the coating film. Thereafter, it was further heated at 110° C. for 1 hour to produce a photochromic laminate having a photochromic layer.

The obtained photochromic laminate was evaluated by the same method as in Example 6. The evaluation results are shown in Table 4.

TABLE 4

| | Pigment in use | Laminate | Maximum absorption wavelength (nm) | 23° C. chromogenic density (—) | 23° C. color fading rate (sec.) | Turbidity |
|---|---|---|---|---|---|---|
| Example 26 | Example 17 | Acrylic | 458 | 0.46 | 43 | 1 |
| | Formula (49) | | 584 | 0.78 | 43 | |
| Example 27 | Example 20 | Acrylic | 451 | 0.57 | 20 | 1 |
| | Formula (60) | | 574 | 0.58 | 20 | |
| Example 28 | Example 21 | Acrylic | 451 | 0.59 | 28 | 1 |
| | Formula (65) | | 572 | 0.60 | 28 | |
| Comparative Example 5 | Comparative Example 1 Formula (36) | Acrylic | 450<br>572 | 0.58<br>0.59 | 35<br>35 | 1 |
| Comparative Example 6 | Comparative Example 2 Formula (37) | Acrylic | 450<br>570 | 0.59<br>0.60 | 32<br>32 | 1 |
| Comparative Example 7 | Comparative Example 3 Formula (38) | Acrylic | 450<br>573 | 0.58<br>0.59 | 30<br>30 | 1 |

Glycidyl methacrylate 1 part by mass

Phenylbis(2,4,6-trimethylbenzoyl)phosphine oxide (trade name: Irgacure819 manufactured by BASF SE) (polymerization initiator) 0.3 parts by mass Bis(1,2,2,6,6-pentamethyl-4-piperidyl)sebacate (molecular weight: 508) (stabilizer) 3 parts by mass Ethylenebis(oxyethylene)bis[3-(5-tert-butyl-4-hydroxy-m-tolyl)propionate] (Irganox245 manufactured by Ciba Specialty Chemicals Inc.) (stabilizer) 1 part by mass L7001 (trade name, manufactured by Toray Dow Corning Co., Ltd.; (leveling agent) 0.1 parts by mass In the photochromic curable composition, 2.5 mmol of a photochromic compound was added relative to 100 g of polymerizable compound in the aforementioned blend composition. Using the thus obtained photochromic curable composition, a photochromic laminate was obtained by a coating method. The polymerization method is as follows.

First, a thiourethane-based plastic lens having a center thickness of 2 mm and a refractive index of 1.60 was prepared as an optical base material. This thiourethane-based plastic lens was subjected in advance to alkali etching at 50° C. for 5 minutes using a 10% aqueous solution of sodium hydroxide, and then washed sufficiently with distilled water.

Using a spin coater (1H-DX2 manufactured by MIKASA CO., LTD.), a moisture-curable primer (product name: TR-SC-P, manufactured by Tokuyama Corporation) was coated on the surface of the plastic lens by adjusting the rotational speed so that the film thickness would be 7 μm. Thereafter, about 2 g of the aforementioned photochromic composition

The invention claimed is:

1. A photochromic compound represented by formula (1) or (2) below:

[CF 1]

$$PC\left(L1-X1-L2-[X2-Z]_m\right)_n \quad (1)$$

[CF 2]

$$PC\left(L1-X1-L2-[X2-L3-\{X3-Z\}_l]_m\right)_n \quad (2)$$

in the formulae,

PC is a group having at least one photochromic moiety,

X1 and X3 are each independently a linear or branched alkylene group having 12 to 30 carbon atoms, a polyoxypropylene group having 3 to 200 repeating units, a polyoxyethylene group having 3 to 200 repeating units, a polyoxytetramethylene group having 3 to 200 repeating units, or a polysiloxane group having 3 to 200 repeating units, where the repeating unit of the polysiloxane group comprises a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms, X2 is a linear or branched alkylene group having 12 to 30 carbon atoms, a polyoxypropylene group having 3 to 200 repeating units, a polyoxyethylene group having 3 to 200 repeating units, or a polyoxytetramethylene group having 3 to 200 repeating units, X1 and X2 groups are different from each other, X2 and X3 groups are different from each other, and X1 and X3 may be the same group, when X2 in the formula (1) or X3 in the formula (2) is a linear or branched alkylene group having 12 to 30 carbon atoms, Z is a hydrogen atom, a methyl group, or an alkyloxy group having 1 to 10 carbon atoms; when X2 in the formula (1) or X3 in the formula (2) is a polyoxypropylene group having 3 to 200 repeating units, a polyoxyethylene group having 3 to 200 repeating units, a polyoxytetramethylene group having 3 to 200 repeating units, or a polysiloxane group having 3 to 200 repeating units comprising a silylene oxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms, Z is a hydrogen atom, an alkyl group having 1 to 10 carbon atoms, or an alkyloxy group having 1 to 10 carbon atoms, L1 is a divalent group and is selected from the groups listed below, where the dashed line portion indicates the portion to be bonded to the photochromic moiety PC and X1,

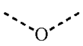
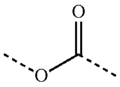
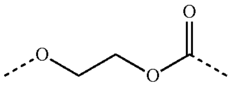
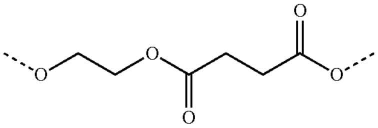
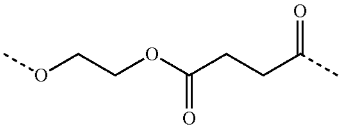
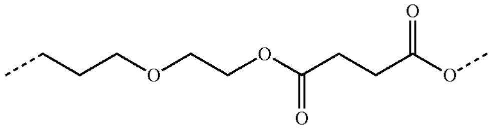
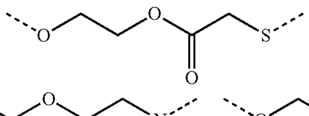
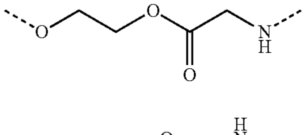
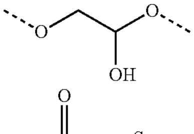
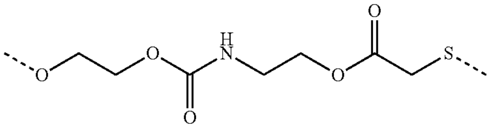
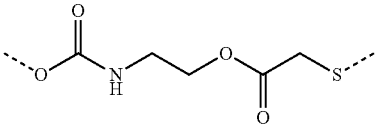

-continued

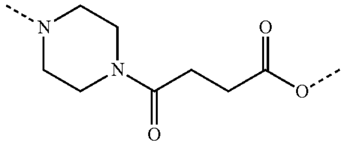
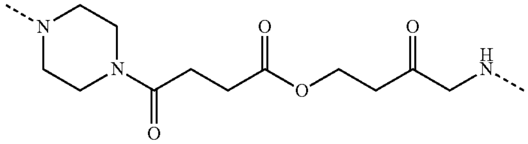

L2 is an m+1 valent bond and is selected from the groups listed below, where the dashed line portion indicates a bond to X1 and X2,

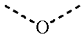
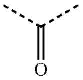
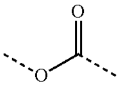
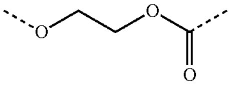
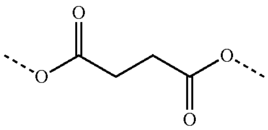
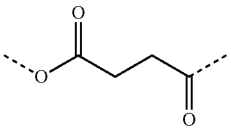
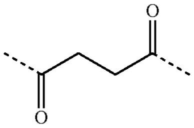
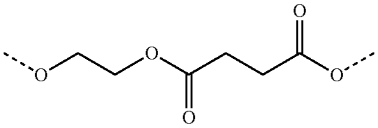
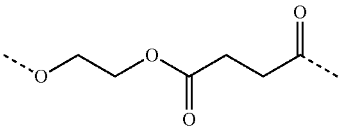
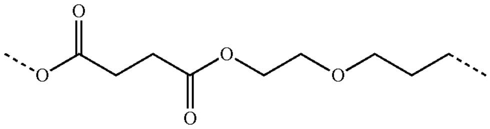
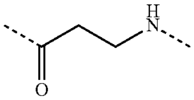
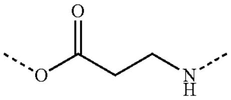
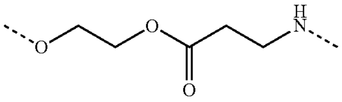
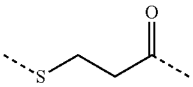
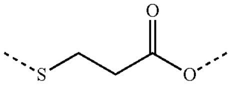
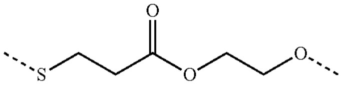
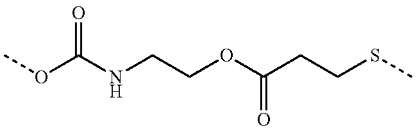
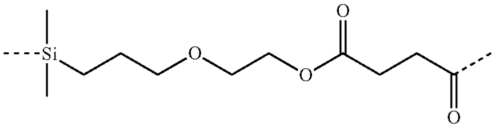

-continued
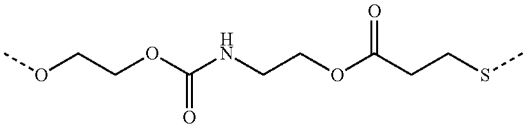
L3 is an l+1 valent bond and is selected from the groups listed below, where the dashed line portion indicates a bond to X2 and X3, and
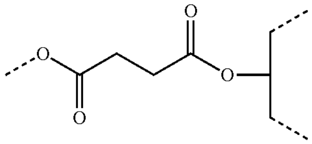
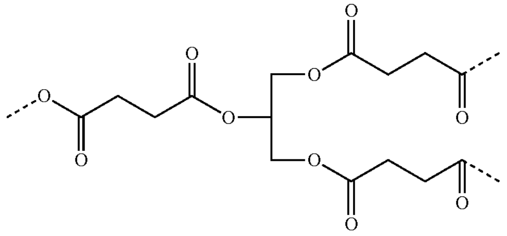
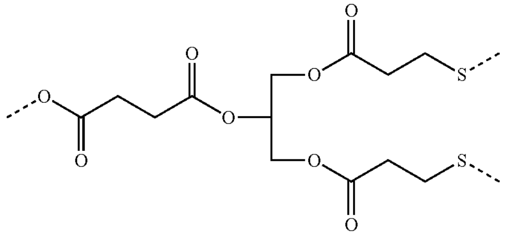
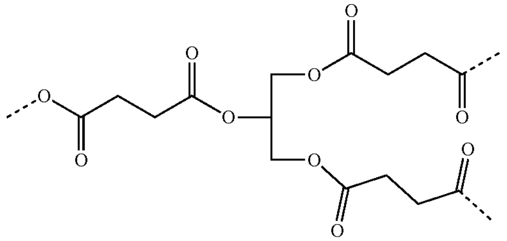
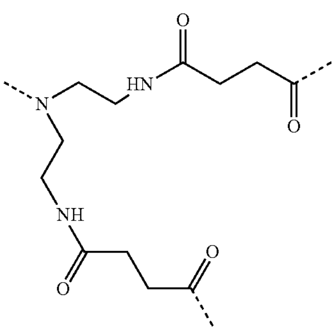
-continued
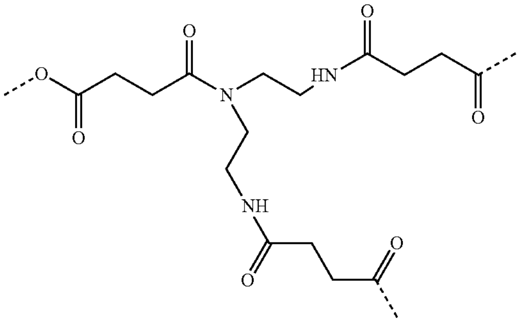
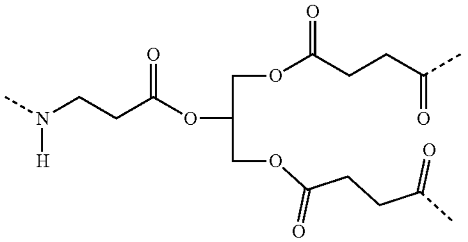
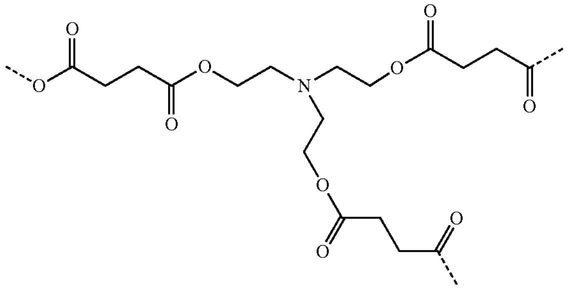
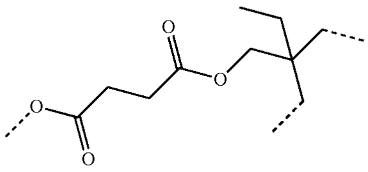
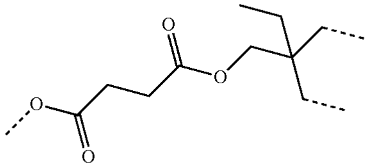
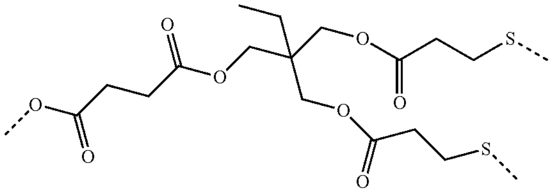
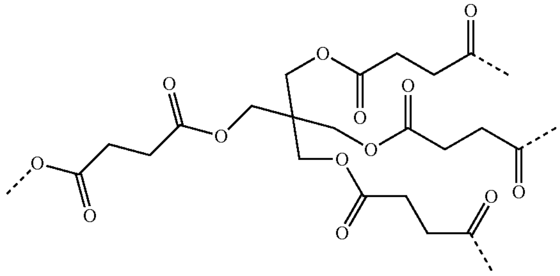

-continued

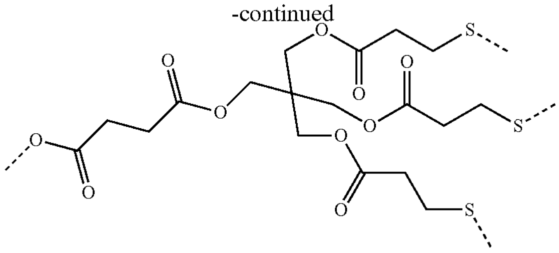

n is an integer of 1 to 8; m is an integer of 1 to 4; and l is an integer of 1 to 4.

2. The photochromic compound according to claim 1, wherein the X1 is a linear or branched alkylene group having 12 to 30 carbon atoms, a polyoxypropylene group having 3 to 200 repeating units, or a polysiloxane group having 3 to 200 repeating units comprising a sylileneoxy group having two substituents selected from the group consisting of a linear or branched alkyl group having 1 to 10 carbon atoms, a linear or branched alkyloxy group having 1 to 10 carbon atoms, and an aromatic group having 6 to 10 carbon atoms, and the X2 is a polyoxyethylene group having 3 to 200 repeating units or a polyoxytetramethylene group having 3 to 200 repeating units.

3. The photochromic compound according to claim 2, wherein the photochromic moiety has at least one structure selected from the group consisting of naphthopyran, spirooxazine, spiropyran, flugide, flugimide, and diarylethene.

4. The photochromic compound according to claim 1, wherein the X1 is a polyoxyethylene group having 3 to 200 repeating units, and the X2 is a linear or branched alkylene group having 12 to 30 carbon atoms, a polyoxypropylene group having 3 to 200 repeating units, or a polyoxytetramethylene group having 3 to 200 repeating units.

5. The photochromic compound according to claim 4, wherein the photochromic moiety has at least one structure selected from the group consisting of naphthopyran, spirooxazine, spiropyran, flugide, flugimide, and diarylethene.

6. The photochromic compound according to claim 1, wherein the X1 is a polyoxytetramethylene group having 3 to 200 repeating units, and the X2 is a linear or branched alkylene group having 12 to 30 carbon atoms, a polyoxypropylene group having 3 to 200 repeating units, or a polyoxyethylene group having 3 to 200 repeating units.

7. The photochromic compound according to claim 6, wherein the photochromic moiety has at least one structure selected from the group consisting of naphthopyran, spirooxazine, spiropyran, flugide, flugimide, and diarylethene.

8. The photochromic compound according to claim 1, wherein the at least one photochromic moiety has at least one structure selected from the group consisting of naphthopyran, spirooxazine, spiropyran, flugide, flugimide, and diarylethene.

9. The photochromic compound according to claim 8, wherein the naphthopyran moiety is an indenonaphthopyran moiety.

10. The photochromic compound according to claim 9, wherein the indenonaphthopyran moiety is represented by formula (6) below:

[CF 3]

(6)

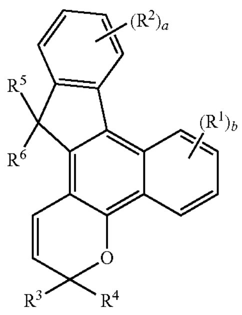

in the formula, $R^1$ and $R^2$ are each independently a bond to bond to the L1, a hydroxyl group, an alkyl group, a haloalkyl group, a cycloalkyl group that may have a substituent, an alkoxy group, an amino group, a substituted amino group, an amide group, a substituted amide group, a heterocyclic group that may have a substituent, a cyano group, a halogen atom, an alkylthio group, an arylthio group that may have a substituent, a nitro group, a formyl group, a hydroxycarbonyl group, an alkylcarbonyl group, an alkoxycarbonyl group, an aralkyl group that may have a substituent, an aralkoxy group that may have a substituent, an aryloxy group that may have a substituent, an aryl group that may have a substituent, a heteroaryl group that may have a substituent, a thiol group, an alkoxyalkylthio group, a haloalkylthio group, or a cycloalkylthio group that may have a substituent, a is an integer of 0 to 4, and b is an integer of 0 to 4, when a is 2 to 4, a plurality of $R^2$ may be the same or different from each other, when b is 2 to 4, a plurality of $R^1$ may be the same or different from each other, when a is 2 to 4 and neighboring $R^2$ are present, the two neighboring $R^2$ together may form a ring that may contain an oxygen atom, a carbon atom, a sulfur atom, or a nitrogen atom together with the carbon atom to be bonded to the $R^2$, and the ring may also have a substituent, when b is 2 to 4 and neighboring $R^1$ are present, the two neighboring $R^1$ together may form a ring that may contain an oxygen atom, a carbon atom, a sulfur atom, or a nitrogen atom together with the carbon atom to be bonded to the $R^1$, and the ring may also have a substituent, $R^3$ and $R^4$ are each independently an aryl group that may have a substituent or a heteroaryl group that may have a substituent, and the substituent may be bonded to the L1, $R^5$ and $R^6$ are each independently a bond to be bonded to the L1, a hydrogen atom, a hydroxyl group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group that may have a substituent, an aralkoxy group that may have a substituent, an aryloxy group that may have a substituent, an aryl group that may have a substituent, or a heterocyclic group that may have a substituent, two of $R^5$ and Re together with carbon atoms at the 13-position as a target for bonding, may form an aliphatic ring having 3 to 20 ring-membered carbon atoms, a fused polycyclic ring having an aromatic ring or an aromatic heterocyclic ring fused to the aliphatic ring, a heterocyclic ring having 3 to 20 ring-membered atoms, or a fused polycyclic ring having an aromatic ring or an aromatic heterocyclic ring fused to the heterocyclic ring, where the rings may have substituents, the number of n groups selected from the group consisting of a substituent of an aryl group of $R^1$, $R^2$ or $R^3$, a substituent of a heteroaryl group of $R^3$, a substituent of an aryl group of $R^4$, a substituent of a heteroaryl group, $R^5$, and $R^6$ are bonded to the L1.

11. A photochromic curable composition comprising the photochromic compound according to claim 1 and a polymerizable compound.

12. A cured body that is a polymer of the photochromic curable composition according to claim 11.

13. A lens comprising the cured body according to claim 12.

14. Eyeglasses comprising the lens according to claim 13.

* * * * *